(12) United States Patent
Chen et al.

(10) Patent No.: US 9,105,200 B2
(45) Date of Patent: Aug. 11, 2015

(54) SEMI-AUTOMATED OR FULLY AUTOMATED, NETWORK AND/OR WEB-BASED, 3D AND/OR 4D IMAGING OF ANATOMY FOR TRAINING, REHEARSING AND/OR CONDUCTING MEDICAL PROCEDURES, USING MULTIPLE STANDARD X-RAY AND/OR OTHER IMAGING PROJECTIONS, WITHOUT A NEED FOR SPECIAL HARDWARE AND/OR SYSTEMS AND/OR PRE-PROCESSING/ANALYSIS OF A CAPTURED IMAGE DATA

(71) Applicants: Yuanming Chen, Aurora, CO (US); Sunhwa Jung, Centential, CO (US)

(72) Inventors: Yuanming Chen, Aurora, CO (US); Sunhwa Jung, Centential, CO (US)

(73) Assignee: QUANTANT TECHNOLOGY, INC., Greenwood Village, CO (US)

( * ) Notice: Subject to any disclaimer, the term of this patent is extended or adjusted under 35 U.S.C. 154(b) by 222 days.

(21) Appl. No.: 13/633,811

(22) Filed: Oct. 2, 2012

(65) Prior Publication Data
US 2013/0085774 A1 Apr. 4, 2013

Related U.S. Application Data

(60) Provisional application No. 61/542,866, filed on Oct. 4, 2011.

(51) Int. Cl.
*G09B 23/28* (2006.01)
(52) U.S. Cl.
CPC ...................................... *G09B 23/28* (2013.01)
(58) Field of Classification Search
None
See application file for complete search history.

(56) References Cited

U.S. PATENT DOCUMENTS

| | | |
|---|---|---|
| 5,584,701 A | 12/1996 | Lampotang et al. |
| 5,791,907 A | 8/1998 | Ramshaw et al. |
| 6,024,576 A | 2/2000 | Bevirt et al. |
| 6,047,080 A | 4/2000 | Chen et al. |
| 6,088,020 A | 7/2000 | Mor |
| 6,113,395 A | 9/2000 | Hon |
| 6,193,519 B1 | 2/2001 | Eggert et al. |
| 6,267,599 B1 | 7/2001 | Bailey |
| 6,375,471 B1 | 4/2002 | Wendlandt et al. |
| 6,470,302 B1 | 10/2002 | Cunningham et al. |
| 6,538,634 B1 | 3/2003 | Chui et al. |
| 6,628,977 B2 | 9/2003 | Graumann et al. |
| 6,654,000 B2 | 11/2003 | Rosenberg et al. |
| 6,912,265 B2 | 6/2005 | Hebecker et al. |
| 6,929,481 B1 | 8/2005 | Alexander et al. |

(Continued)

*Primary Examiner* — Michelle L Le
(74) *Attorney, Agent, or Firm* — Guy Kevin Townsend; Peter Scull

(57) ABSTRACT

Systems, methods and software are provided that simulate or facilitate imaging of medical procedures for purposes of optimized performance, simulation, training and/or accreditation. More particularly, aspects of the invention relate to a system, apparatus and/or subsystems for generating 3D and/or 4D imaging from 2 or more 2D images and/or projections for use in performing, simulating, training, and/or facilitating medical-access procedures. Such procedures use semi-automated and/or fully automated, network and/or web-based, 3D and/or 4D imaging of anatomy and corresponding medical devices or treatment for performing, training, rehearsing and/or conducting medical procedures, using multiple (e.g., >2 and/or >3) standard 2D x-ray and/or other radiation or sound imaging projections without a need for special hardware and/or systems (e.g., rotational runs) and/or pre-processing/analysis of a captured image data.

16 Claims, 9 Drawing Sheets

(56) References Cited

U.S. PATENT DOCUMENTS

| | | | |
|---|---|---|---|
| 7,010,080 B2 | 3/2006 | Mitschke et al. | |
| 7,120,283 B2 | 10/2006 | Thieret et al. | |
| 7,129,946 B2 | 10/2006 | Ditt et al. | |
| 7,234,937 B2 | 6/2007 | Sachdeva et al. | |
| 7,249,951 B2 | 7/2007 | Bevirt et al. | |
| 7,249,952 B2 | 7/2007 | Ranta et al. | |
| 7,315,605 B2 | 1/2008 | Boese et al. | |
| 7,327,872 B2 | 2/2008 | Vaillant et al. | |
| 7,349,832 B2 | 3/2008 | Anderson | |
| 7,404,716 B2 | 7/2008 | Gregorio et al. | |
| 7,519,414 B2 | 4/2009 | Mitschke et al. | |
| 7,599,730 B2 | 10/2009 | Hunter et al. | |
| 7,653,229 B2 | 1/2010 | Kaufhold et al. | |
| 7,689,019 B2 | 3/2010 | Boese et al. | |
| 7,756,567 B2 | 7/2010 | Kuduvalli et al. | |
| 7,761,136 B2 | 7/2010 | Ohishi et al. | |
| 7,862,340 B2 | 1/2011 | Chen et al. | |
| 7,991,105 B2 | 8/2011 | Mielekamp et al. | |
| 8,004,524 B2 | 8/2011 | Deinzer | |
| 2002/0168618 A1 | 11/2002 | Anderson et al. | |
| 2003/0015207 A1 | 1/2003 | Herold et al. | |
| 2003/0068607 A1 | 4/2003 | Gregorio et al. | |
| 2004/0009459 A1 | 1/2004 | Anderson et al. | |
| 2004/0076940 A1 | 4/2004 | Alexander et al. | |
| 2004/0152970 A1 | 8/2004 | Hunter et al. | |
| 2005/0214726 A1 | 9/2005 | Feygin et al. | |
| 2006/0008786 A1 | 1/2006 | Feygin et al. | |
| 2006/0184652 A1* | 8/2006 | Teodosiu et al. | 709/221 |
| 2006/0241413 A1 | 10/2006 | Boese et al. | |
| 2009/0177454 A1* | 7/2009 | Bronstein et al. | 703/11 |
| 2009/0219289 A1 | 9/2009 | Kalvin | |
| 2010/0014740 A1 | 1/2010 | Movassaghi et al. | |
| 2011/0085637 A1 | 4/2011 | Boese et al. | |
| 2011/0243407 A1* | 10/2011 | Sofka et al. | 382/128 |

\* cited by examiner

SEMI-AUTOMATED OR FULLY AUTOMATED, NETWORK AND/OR WEB-BASED, 3D AND/OR 4D IMAGING OF ANATOMY FOR TRAINING, REHEARSING AND/OR CONDUCTING MEDICAL PROCEDURES, USING MULTIPLE STANDARD X-RAY AND/OR OTHER IMAGING PROJECTIONS, WITHOUT A NEED FOR SPECIAL HARDWARE AND/OR SYSTEMS AND/OR PRE-PROCESSING/ANALYSIS OF A CAPTURED IMAGE DATA

FIELD OF INVENTION

Aspects of the present invention relate generally to systems that simulate or facilitate imaging of medical procedures for purposes of optimized performance, simulation, training and/or accreditation. More particularly, aspects of the invention relate to a system, apparatus and/or subsystems for generating 3D and/or 4D imaging from 2 or more 2D images and/or projections for use in performing, simulating, training, and/or facilitating medical-access procedures. Such procedures use semi-automated and/or fully automated, network and/or web-based, 3D and/or 4D imaging of anatomy and corresponding medical devices or treatment for performing, training, rehearsing and/or conducting medical procedures, using multiple (e.g., >2 and/or >3) standard 2D x-ray and/or other radiation or sound imaging projections without a need for special hardware and/or systems (e.g., rotational runs) and/or pre-processing/analysis of a captured image data.

BACKGROUND OF INVENTION

Medical practitioners, such as military medics, civilian emergency-medical personnel, nurses, and/or physicians, routinely perform medical and/or medical and/or vascular-access procedures (e.g., intravenous insertion, central venous line placement and/or peripherally-inserted central catheter, etc). It is desirable for a practitioner to be proficient at performing these procedures since a proficient practitioner is less likely to injure a patient and/or is almost certain to reduce a patient's level of discomfort.

Becoming proficient in medical and/or medical and/or vascular-access procedures requires practice. In fact, a certification and/or re-certification requirements of some states mandate a minimal number of needle sticks, etc., per year per provider. Historically, medical practitioners practiced needle-based procedures on live volunteers. More recently, simulation techniques and/or devices have been developed to provide training in medical and/or vascular-access procedures optionally without a use of live volunteers.

Some medical and/or vascular-access simulation systems that are in background publications include an interface device and/or a data processing system. To practice a medical and/or vascular-access procedure, a user manipulates an "instrument," which extends from a device and/or serves as a catheter-needle. Potentiometers and/or encoders within an interface device track a motion and/or position of an instrument and/or relay this information to a data processing system. A data processing system performs a simulation of a structure and/or substructure of human anatomy, and/or determines a effect of an instrument's motion on a the anatomy. Simulated results are displayed by a data processing system. Using a motion information from an interface device, a data processing system also generates a control signal that controls a force-feedback system that is coupled to an instrument. A force-feedback system generates various resistive and/or reactive forces that are intended to simulate a forces that are experienced by a medical practitioner during an actual medical and/or vascular-access procedure. A user senses these forces during manipulation of an instrument.

Although some systems in background publications have a ability to simulate medical procedures like percutaneous coronary interventions (PCI), they are of limited value in assisting the medical professionals to prepare for their upcoming procedures since those systems don't have the capability to rapidly build a simulation based on the incoming patient's unique anatomy. Without the ability to build patient-specific simulations rapidly, those systems cannot provide decision support during mission-critical procedures like cardiac catheterization. As a result, physicians relies mostly on subjective pattern recognition and subjective quantification of key features to diagnose and treat patients.

The inability of prior medical and/or vascular-access simulation systems to realistically simulate a medical and/or vascular-access procedure for incoming patients limits their usefulness as training and/or accreditation tools.

SUMMARY OF INVENTION

The present invention relates to systems, apparatus, software, IT systems, and/or subsystems, for imaging and/or simulating medical-access procedures systems using semi-automated and/or fully automated, network and/or web-based 3D and/or 4D imaging of anatomy for training, rehearsing and/or conducting medical procedures, using multiple (e.g., >2 and/or >3) standard x-ray and/or other imaging projections without a need for special hardware and/or systems (e.g., rotational runs) and/or pre-processing/analysis of a captured image data.

The present invention provides one and/or more of a following: physicians and/or other medical practitioners performing one and/or more aspects of aspects of the invention can (i) assess a risks and/or difficulties of medical imaging for medical procedures for specific patient; (ii) to choose appropriate patients for a procedure and/or take actions to reduce a risks of complications and/or failure.

As a non-limiting example, aspects of the invention can be used for angiographic image analysis including 3D models to better plan and/or execute percutaneous coronary interventions (PCI) in a safe and/or effective manner. Physicians and/or hospitals can monitor their PCI services, benchmark their results against best practices in a country, and/or identify areas of improvement. Professional societies, government agencies, and/or medical device and/or pharmaceutical companies can monitor a size and/or characteristics of PCI care that is rapidly becoming a medical service costing billions of dollars and/or impacting millions of patients. A wealth of data gathered from aspects of the invention using an internet and/or other data storage, collection and/or use for such medical data and/or imaging can facilitate a use aspects of an invention for many uses, including but not limited to, training courses, clinical trials in devices and/or pharmaceuticals, other medical research, and/or a development of improved medical imaging and/or PCI products.

The present invention can provide and/or accomplish these benefits in different aspects, e.g., but not limited to, patient-specific decision-support system including an 3D and/or 4D image analysis service delivered at a point of care and/or structured to enhance a physician's judgment and/or experience and/or improve patient outcomes. An aspect of the present invention also provides data banks, data systems, and/or data analysis, e.g., data banks combining medical imaging data elements with comprehensive clinical data into a next generation registry. An aspect of the present invention further can provide sophisticated but user-friendly internet, server, and/or cloud-based IT platforms (e.g. cloud computing and/or database infrastructure) for collection of data, advanced image analysis, distribution of results, and/or professional development of physicians.

The present invention can provide and/or establish services that can be distributed locally, regionally, country by country, and/or internationally to improve, standardize, and/or optimize clinical practices, improve patient outcome, enhance healthcare quality and/or safety, and/or maximize a benefits of PCI and/or related medical imaging to patients. A present invention's systems, methods, software, IT and/or other embodiments services can be constructed to be sensitive to a culture, people, and/or health care system of a specific country.

An illustrative embodiment of aspects of the invention is a simulation system that provides patient-specific decision support and realistic training and/or practice for performing medical and/or vascular-access procedures without using human subjects. Unlike most prior-art simulation systems, some embodiments of a present system provide a realistic, three-dimensional simulation derived directly from the patient's medical images (e.g. patient's 2D angiographic images). Since the patient-specific model accurately describes the real patient anatomy (e.g., human heart, vasculature, etc.), the simulation helps medical professionals to rehearse a medical procedure as if the simulated procedure were an actual procedure.

Background publications, such as U.S. patent application Ser. No. 12/224,314, filed by Ran Bronstein et al from Simbionix Ltd, Jan. 13, 2008 (entirely incorporated herein by reference), describes a preoperative surgical simulation method that receives 3D patient images for generating 3D anatomy model of the patient. The 3D medical image in this method is claimed to be a member of the following group: computerized tomography (CT) scan images, magnetic resonance imager (MRI) scan images, ultrasound scan images, and positron emission tomography (PET)-CT scan images. The medical simulation system in our present invention can process not only 3D patient images, but also 2D angiographic images. The value of building 3D patient models from 2D images is significant since common procedures like PCI are predominantly performed with 2D image guidance (e.g. X-ray), not with 3D imaging guidance (e.g. CT, MRI). For example, coronary angiography with X-ray image guidance remains the gold standard in the diagnosis and treatment of coronary artery disease, and over 2 million PCI procedures with 2D image guidance are performed in the US each year. All known background publications don't address the challenge of building 3D simulations with 2D patient images for the purpose of providing patient-specific support.

Other known background publications related to building medical simulation systems, such as U.S. Pat. No. 7,862,340 issued on Jan. 4, 2011, U.S. Pat. No. 7,308,831 issued on Dec. 18, 2007 and U.S. patent Ser. No. 10/538,005 issued on Aug. 9, 2011 (all and each of the above entirely incorporated herein by reference), are based on predefined patient models. Some of those pre-defined models are constructed using 3D modeling software, i.e. from scratch using anatomy books, video clips, etc as references only. Other pre-defined models are reconstructed from real patient data, a process that often takes days or months to complete, and a collection of pre-defined patient models are stored in databases before the simulation system becomes operational. During the operation mode, the system simulates an image-guided procedure according to a virtual model selected by the user.

One or more aspects of the present invention address this challenge, e.g., by incorporating real patient data in the procedure room to assist clinical professionals to achieve better patient outcomes.

An illustrative embodiment of a medical and/or vascular-access simulator includes a data-processing system and/or an interface device, a latter referred to herein as a "haptics device". A unique aspect of the invention is that data-processing system is web-enabled, allowing medical professionals at different geological locations to upload patient-specific data (e.g. 2D angiographic images) to a cloud server and receive patient-specific decision support at any time. A network of web-enabled simulation systems located across a country can provide a cost-effective platform for professional societies, government agencies, and medical device and pharmaceutical companies to standardize clinical practices, and to optimize procedure successes.

An illustrative embodiment of aspects of the cloud server of the invention comprises of a collection of services to support the simulator network, including, but not limited to, Anatomy Reconstruction Cloud Service, Procedure Simulation Cloud Service and Patient Record Cloud Service (FIG. 1).

An illustrative embodiment of aspects of the invention comprises: providing a three-dimensional model of at least a portion of an anatomy, wherein a three-dimensional model describes at least a portion of a blood vessel; providing a three-dimensional model of a medical instrument; and/or generating a force-feedback profile based on an interaction of a model of anatomy and/or a model of a medical instrument. Some configurations of aspects of the invention therefore provide a method for reconstructing a volumetric image of an object. A method includes obtaining a 2D image dataset of an object corresponding to a relevant anatomical region for imaging for medical procedures, wherein a 2D image dataset can includes a plurality of projection radiographs of an imaged object obtained at similar and/or different angles. A method also includes utilizing a 2D image dataset and/or additional information about a object to minimize a selected energy function and/or functions to jointly satisfy and/or arbitrate among a selected set of constraints. A 3D volumetric image representative of an imaged object is thereby obtained through a use of image analysis that can include one and/or more algorithms selected from one and/or more of projection, composition and/or extraction algorithms that convert 2 and/or more and/or 3 and/or more 2D images to 3D and/or 4D images.

Also, some configurations of aspects of the invention provide a method for reconstructing a volumetric image of an object, in which a projection dataset of an object is acquired and/or a projection radiographs are preprocessed to produce quantitative projections that can include one and/or more algorithms selected from one and/or more of projection, composition and/or extraction algorithms that convert 2 and/or more and/or 3 and/or more 2D images to 3D and/or 4D images. In a quantitative projections, a pixel intensities in each quantitative projection correspond to an amount of material each x-ray passed through in its path from a x-ray source to a detector pixel. A method further includes performing an initial reconstruction, and/or choosing an energy definition to minimize, wherein a energy definition includes a term that constrains a reconstructed volumetric image to an N-ary and/or approximately N-ary composition of material classes (where N-ary indicates that each voxel is one of N material classes).

In yet other aspects, aspects of the invention provides a method for reconstructing a volumetric image of a part of anatomy relevant for treatment and/or surgery through a use of image analysis that can include one and/or more algorithms selected from one and/or more of projection, composition and/or extraction algorithms that convert 2 and/or more and/or 3 and/or more 2D images to 3D and/or 4D images. A method includes acquiring a 2D image dataset that includes a set of projection radiographs from a same and/or different projection angles. A geometry of a three-dimensional volume that contains part of anatomy relevant for treatment and/or surgery is estimated to produce an air/tissue volumetric image of an imaged part of anatomy relevant for treatment and/or surgery, and/or thereby a volumetric image of a part of anatomy relevant for treatment and/or surgery. Radiation path lengths through part of anatomy relevant for treatment and/or surgery are determined for each projection radiograph in a 2D image dataset. A method further includes using a determined radiation path lengths and/or 2D image dataset to estimate a percentage and/or amount of equivalent part of anatomy relevant for treatment and/or surgery for each projection radiograph, so that a estimate thereby produces a set of quantitative projections, that can include one and/or more algorithms selected from one and/or more of projection, composition and/or extraction algorithms that convert 2 and/or more and/or 3 and/or more 2D images to 3D and/or 4D images. In addition, a method includes determining an overall percentage equivalent tissue for a plurality of x-ray projection radiographs using a quantitative projections, and/or using a set of quantitative projections to estimate volumetric intensities in a part of anatomy relevant for treatment and/or surgery. A estimated volumetric image intensities are utilized to determine an N-ary and/or almost N-ary volumetric image of a part of anatomy relevant for treatment and/or surgery, wherein at least most voxels of a volumetric image are labeled as one of a member of a set of tissues including any tissue or vessel and/or equivalent tissue.

In yet another aspect, aspects of the invention provides an apparatus for producing a reconstructed volumetric image of an object. A apparatus includes a radiation source, a detector, an image processor and/or a computer. An image processor is not necessarily a separate component from a computer. A apparatus is configured to obtain a 2D image dataset of an object. A apparatus is further configured to utilize a 2D image dataset and/or additional information about a object to minimize a selected energy function and/or functions to jointly satisfy and/or arbitrate among a selected set of constraints. In so doing, a volumetric image is obtained in which each voxel is assigned a specific component material class, through a use of image analysis that can include one and/or more algorithms selected from one and/or more of projection, composition and/or extraction algorithms that convert 2 and/or more and/or 3 and/or more 2D images to 3D and/or 4D images.

In yet another configuration, aspects of the invention provides an apparatus for producing a volumetric image of an object. A apparatus includes a radiation source, a detector, an image processor and/or a computer. An image processor is not necessarily a separate component from a computer. A apparatus is configured to acquire a 2D image dataset of an object and/or preprocess a 2D image dataset to produce quantitative projections. A apparatus is further configured to perform a 3D and/or 4D image reconstruction. An initial reconstructed volumetric image may be used to choose an energy definition to minimize, wherein a energy definition includes a term that constrains a reconstructed volume to an N-ary and/or approximately N-ary composition.

In yet other aspects, aspects of the invention provides an apparatus for producing a reconstructed volumetric image of a part of anatomy relevant for treatment and/or surgery. A apparatus includes a radiation source, a detector, an image processor and/or a computer, although an image processor is not necessarily a separate component from a computer. A apparatus is configured to acquire a 2D image dataset including a set of projection radiographs of a part of anatomy relevant for treatment and/or surgery from a same and/or different projection angle s, and/or estimate a geometry of a three-dimensional volume that contains part of anatomy relevant for treatment and/or surgery to produce an air/tissue volumetric image of an imaged part of anatomy relevant for treatment and/or surgery, and/or thereby a volumetric image of a part of anatomy relevant for treatment and/or surgery. Radiation path lengths through a part of anatomy relevant for treatment and/or surgery are determined for each projection radiograph in a 2D image dataset, and/or determined radiation path lengths and/or a 2D image dataset are used to estimate a percentage and/or amount of equivalent part of anatomy relevant for treatment and/or surgery composition for each projection radiograph. A apparatus thereby produces a set of quantitative projection estimates. A apparatus is further configured to determine an overall percentage tissue for a plurality of x-ray projection radiographs using a quantitative projections and/or to use a set of quantitative projections to estimate volumetric image intensities in a part of anatomy relevant for treatment and/or surgery. A apparatus is also configured to utilize a estimated volumetric image intensities to determine an N-ary and/or almost N-ary reconstruction of a volumetric image of a part of anatomy relevant for treatment and/or surgery. At least most voxels of a volumetric image are labeled as one and/or a other member of a set of tissues including any tissue or vessel and/or tissue.

It will be appreciated that configurations of aspects of the invention are able to generate volumetric images that provide three-dimensional localized quantitative tissue characteristics and/or classification in addition to qualitative information about three-dimensional location, shape, and/or extent of structures provided by various known types of medical imaging, e.g., but not limited to, x-rays, CAT scans, PET scans, MRI, and/or other known methods, e.g., but not limited to, tomosynthesis.

Quantitative information incorporated into three-dimensional volumetric images in various configurations of aspects of the invention adds significant diagnostic value to a reconstructed volume while also providing collateral constraints to aid in management of reconstruction artifacts. Furthermore, in some medical applications, a reconstructed three-dimensional image of an imaged part of anatomy relevant for treatment and/or surgery and/or other structure can be expressed in terms of its constituent tissue types. As a result, reconstructed volumetric images are completely independent of a X-ray technique used to acquire a corresponding 2D image dataset. X-ray technique-independent volumes can be used for making comparisons between volumes reconstructed from datasets acquired on different dates, for example.

Some of configurations of aspects of the invention are not limited to part of anatomy relevant for treatment and/or surgery image reconstruction and/or to medical applications in general, but rather can be used for quantitative reconstruction of an image of any object having a plurality of constituent material classes.

DESCRIPTION

Figure 1:
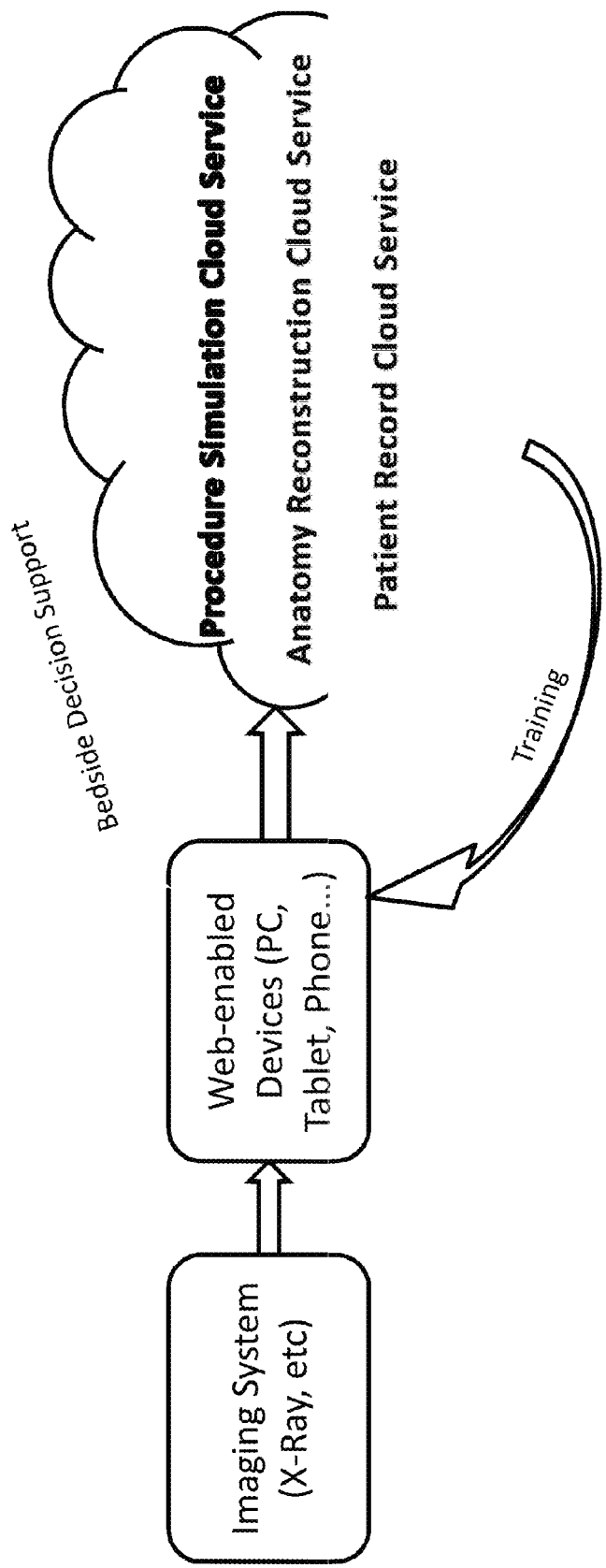
FIG. 1 is a flow diagram representing a non-limiting example of a projection algorithm that can be used in an invention, that uses ray tracing method to construct one 3D grid for each angiogram (in other words, each 2D image is "projected" to a 3D volume). Each projection takes into account a original anatomical image as well as a detector (e.g., a C-ARM) location information. A ray tracing method can make corrections to a projection results when annotation data is present.

The present invention relates to systems, apparatus, software, IT systems, and/or subsystems, for imaging and/or simulating medical-access procedures systems using semi-automated and/or fully automated, network and/or web-based 3D and/or 4D imaging of anatomy for training, rehearsing and/or conducting medical procedures, using multiple (e.g., >2 and/or >3) standard x-ray and/or other imaging projections without a need for special hardware and/or systems (e.g., rotational runs) and/or pre-processing/analysis of a captured image data.

The present invention provides one and/or more of a following: physicians and/or other medical practitioners performing one and/or more aspects of aspects of the invention can (i) a assess a risks and/or difficulties of medical imaging for medical procedures for specific patient (ii) to choose appropriate patients for a procedure and/or take actions to reduce a risks of complications and/or failure.

As a non-limiting example, aspects of the invention can be used for angiographic image analysis including 3D models to better plan and/or execute percutaneous coronary interventions (PCI) in a safe and/or effective manner. Physicians and/or hospitals can monitor their PCI services, benchmark their results against best practices in a country, and/or identify areas of improvement. Professional societies, government agencies, and/or medical device and/or pharmaceutical companies can monitor a size and/or characteristics of PCI care that is rapidly becoming a medical service costing billions of dollars and/or impacting millions of patients. A wealth of data gathered from aspects of the invention using an internet and/or other data storage, collection and/or use for such medical data and/or imaging can facilitate a use aspects of an invention for many uses, including but not limited to, training courses, clinical trials in devices and/or pharmaceuticals, other medical research, and/or a development of improved medical imaging and/or PCI products.

The present invention can provide and/or accomplish these benefits in different aspects, e.g., but not limited to, patient-specific decision-support system including an 3D and/or 4D image analysis service delivered at a point of care and/or structured to enhance a physician's judgment and/or experience and/or improve patient outcomes. An aspect of the present invention also provides data banks, data systems, and/or data analysis, e.g., data banks combining medical imaging data elements with comprehensive clinical data into a next generation registry. An aspect of the present invention further can provide sophisticated but user-friendly internet, server, and/or cloud-based IT platforms (e.g., cloud computing and/or database infrastructure) for collection of data, advanced image analysis, distribution of results, and/r professional development of physicians.

The present invention can provide and/or establish services that can be distributed locally, regionally, country by country, and/or internationally to improve, standardize, and/or optimize clinical practices, improve patient outcome, enhance healthcare quality and/or safety, and/or maximize a benefits of medical imaging, including, but not limited to, PCI and/or related medical imaging to patients. A present invention's systems, methods, software, IT and/or other embodiments services can be constructed to be sensitive to a culture, people, and/or health care system of a specific country.

An illustrative embodiment of aspects of the invention is a simulation system that provides patient-specific decision support and realistic training and/or practice for performing medical and/or vascular-access procedures without using human subjects. Unlike most prior-art simulation systems, some embodiments of a present system provide a realistic, three-dimensional simulation derived directly from the patient's medical images (e.g. patient's 2D angiographic images).

Figure 10:
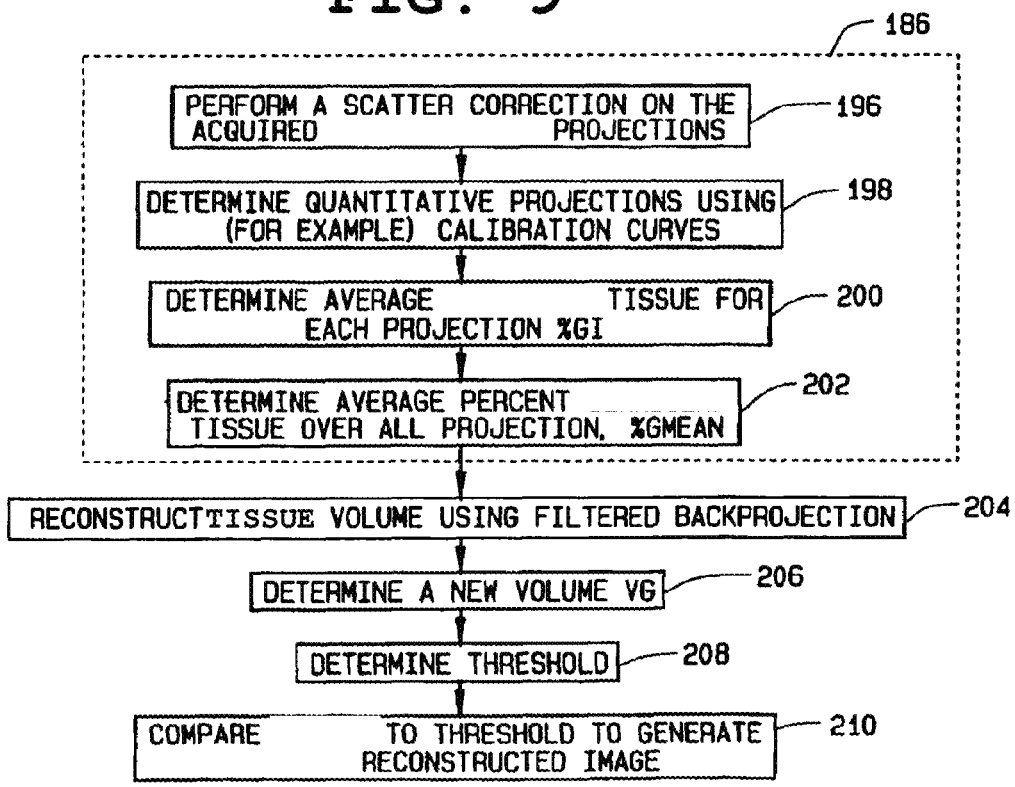
FIG. 10 is a flow chart representing configurations of aspects of the invention in which a scatter correction is performed on acquired image projections.

Referring to FIG. 1, the Anatomy Reconstruction Cloud Service and the Patient Simulation Cloud Service are essential to the process of converting 2D images to 3D/4D images, and the distributions of 3D/4D images to the end users:

Anatomy Reconstruction Cloud Service receives multiple standard 2D x-ray and/or other radiation or sound imaging projections uploaded by medical professionals. The most common format for image storage is digital imaging and communications in medicine (DICOM). Upon receiving the raw patient data, the Anatomy Reconstruction Cloud Service can launch a series of algorithms, including projection algorithm, composition algorithm and extraction algorithm (FIG. 10) to build volumetric & polygonal mesh representation of the patient 3D model. The mesh-based 3D model is then sent back to the user for real-time display, since mesh format is typically much smaller than its volumetric equivalent, allowing for more efficient data transmission of 3D models back to the user. Common formats for the mesh-based 3D model are OBJ, COLLADA and X3D format.

It should be noted that the Anatomy Reconstruction Cloud Service can also be used to generate 4D models. The inputs to the cloud server will be a series of x-ray 2D images from multiple viewing angles, each series depicting a certain organ during a certain time period. In such an embodiment, a collection of mesh-based 3D models will be produced, each representing the patient anatomy at a certain time frame.

3D/4D mesh models are then displayed on each simulation system with the support of Anatomy Reconstruction Client Module, a software module that can be distributed to the simulation systems through different mechanisms. For example, Anatomy Reconstruction Client Module can be deployed to run inside a web browser, or be installed as a standalone application on the simulation system.

For simulation systems equipped with advanced graphics display card, the Anatomy Reconstruction Client Module can render not only 3D/4D mesh models, but also the volumetric representation of the patient 3D model, a format that carries more visualization details than the 3D/4D mesh format. The 3D images will be rendered on at least one image display devices, including using 3D projectors in a class room setting to allow users to watch and interact with 3D/4D models in an immersive environment, not unlike watching a 3D movie in a movie theater.

FIG. 1 is a flow diagram representing a non-limiting example of a projection algorithm that can be used in an invention, that uses ray tracing method to construct one 3D grid for each angiogram (in other words, each 2D image is "projected" to a 3D volume). Each projection takes into account a original anatomical image as well as a detector (e.g., a C-ARM) location information. A ray tracing method will make corrections to a projection results when annotation data is present.

When performing the projection operation, a rotational matrix is constructed for each C-ARM position. This matrix is calculated by conducting multiplication operation with three matrices that represent pitch, roll and yaw rotations of the C-ARM. The resulting rotational matrix is then applied to evaluate each pixels on the 2D X-ray image, converting each 2D point to a 3D ray in the world space.

Figure 2:
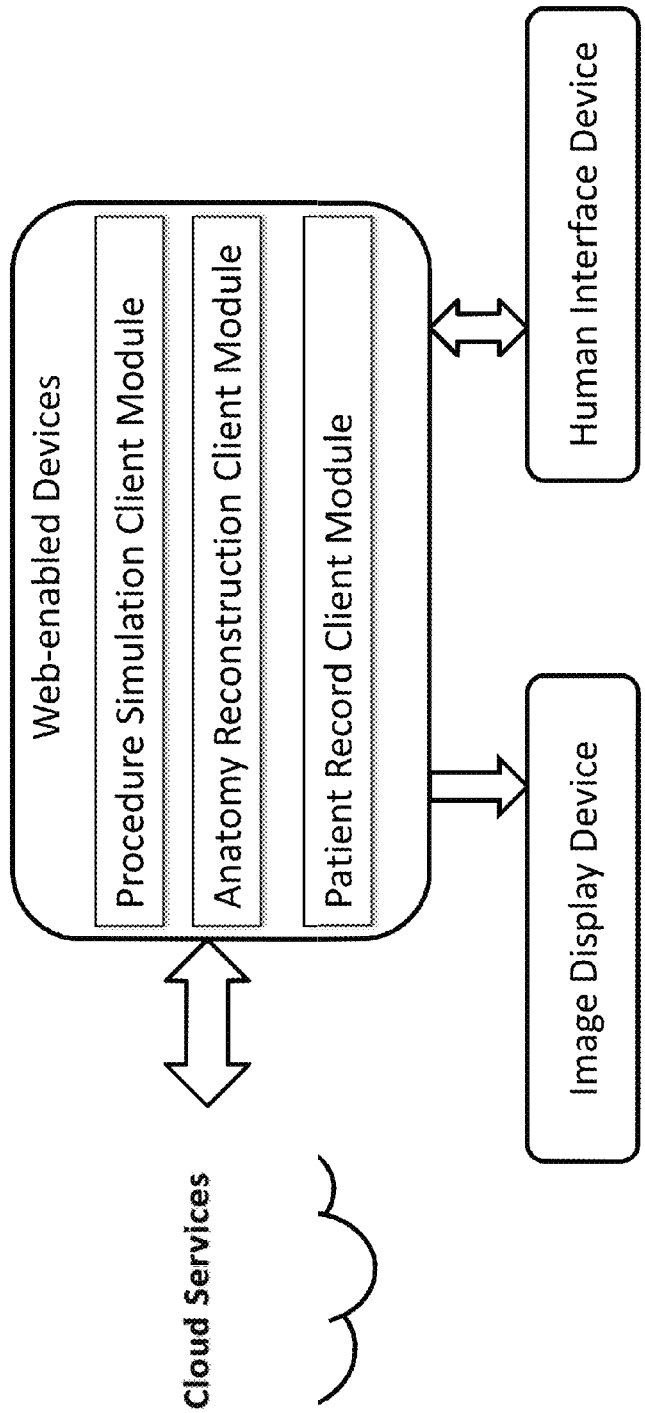
FIG. 2 is a flow diagram representing a non-limiting example of a composition algorithm that can be used in aspects of the invention, that combines all "projection grids" into one. An inputs to a composition algorithm are 3D "projection grids" constructed from a previous step. Each grid represents a single 2D angiogram and/or other anatomical, image. Each grid cell now stores a collection of color information retrieved those "projection grids."

FIG. 2 is a flow diagram representing a non-limiting example of a composition algorithm that can be used in aspects of the invention, that combines all "projection grids" into one. An inputs to a composition algorithm are 3D "projection grids" constructed from a previous step. Each grid represents a single 2D angiogram and/or other anatomical, image. Each grid cell now stores a collection of color information retrieved those "projection grids."

A main step of the composition algorithm involves evaluating errors introduced by the projection algorithm. The errors are often a result of random motion patterns of the C-ARMs, X-ray scatter effects or mismatches of heart cycles among different projection images. In order to correct the error, epipolar constraints are applied to compute the ioscenter offset, allowing feature points on multiple projections to be aligned correctly.

Figure 3:
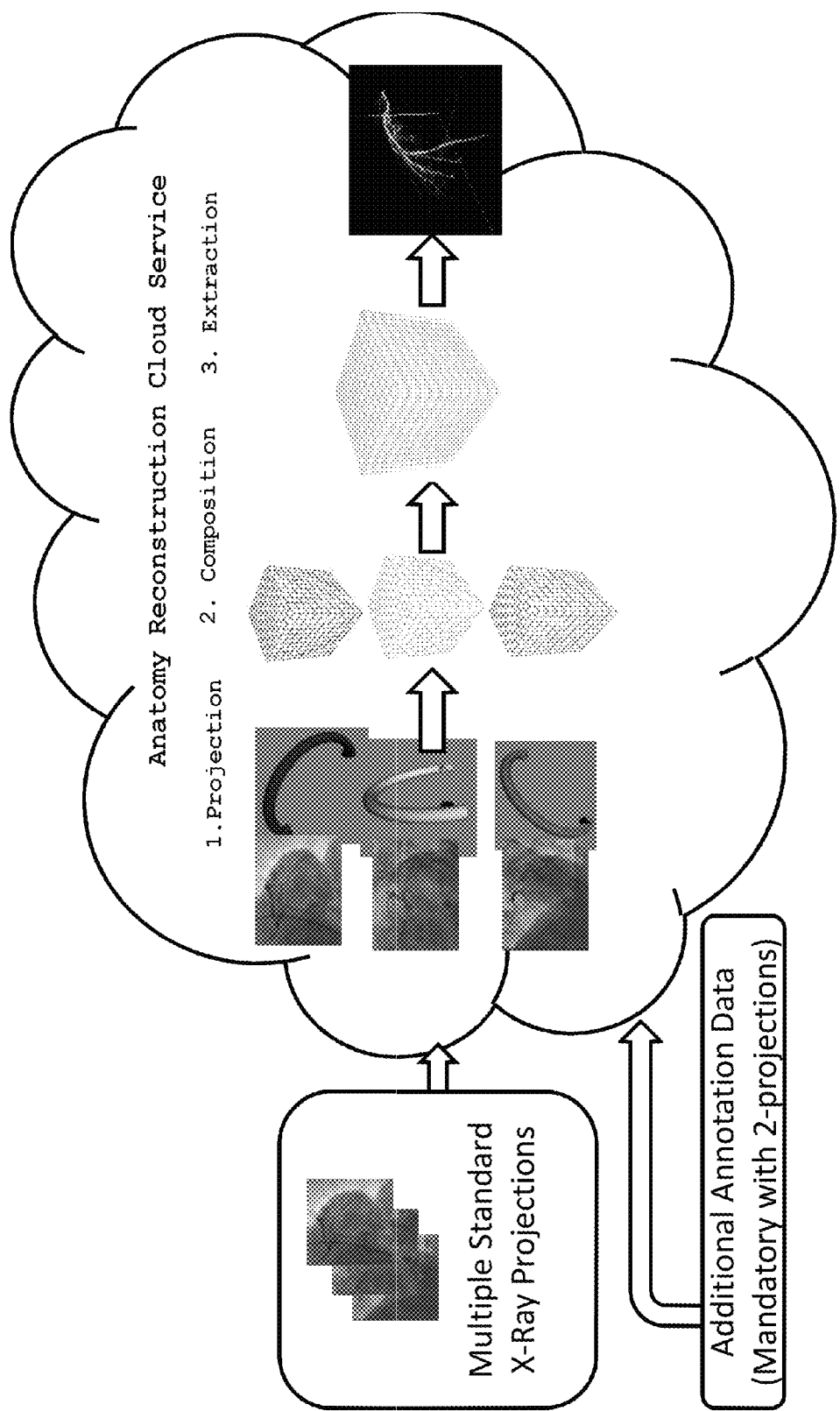
FIG. 3 is a flow diagram representing a non-limiting example of an extraction algorithm that can be used in aspects of the invention, that evaluates each grid cell's colors to determine its likelihood of being part of a valid anatomical structure, e.g., but not limited to, a valid blood vessel. Using spatial statistics and/or image processing techniques, a subset of grid cells and/or other anatomical structure can be identified as validated anatomical structures, e.g., but not limited to, blood vessels. A polygonal mesh of an isosurface can be constructed from an identified grid cells and/or other anatomical structure using surface extraction algorithms. An input to a composition algorithm is a consolidated 3D grid output from a previous step.
Figure 4:
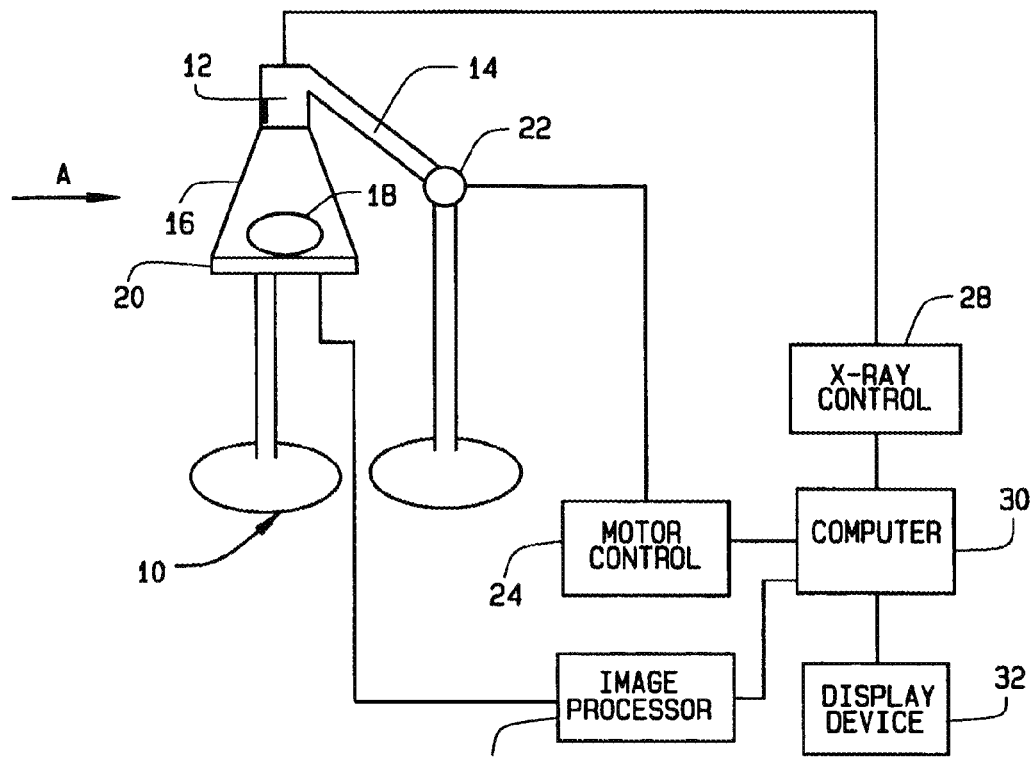
FIG. 4 is a block diagram representative of some configurations of an imaging system of aspects of the invention.
Figure 5:
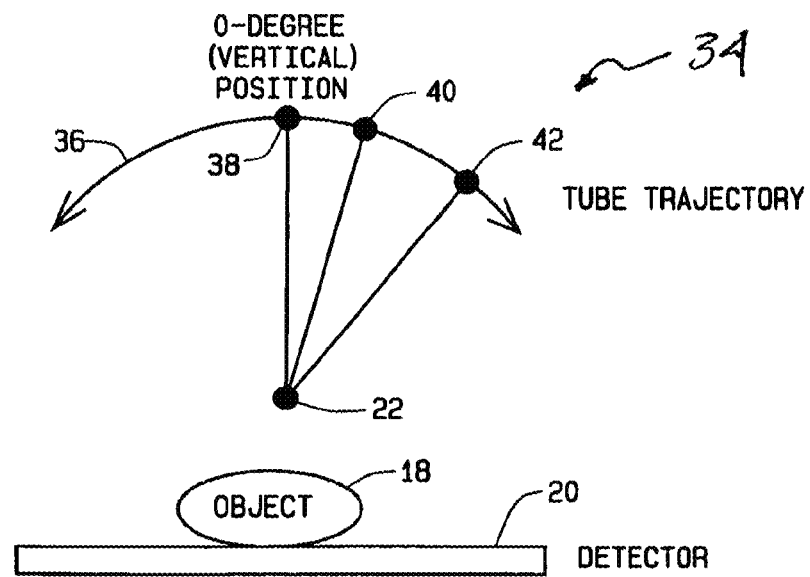
FIG. 5 is an illustration of system geometry of various configurations of imaging systems represented by FIG. 4.

FIG. 3 is a flow diagram representing a non-limiting example of an extraction algorithm that can be used in aspects of the invention, that evaluates each grid cell's colors to determine its likelihood of being part of a valid anatomical structure, e.g., but not limited to, a valid blood vessel. Using spatial statistics and/or image processing techniques, an energy minimization function is applied to all grid cells, and a subset of grid cells and/or other anatomical structure can be identified as validated anatomical structures, e.g., but not limited to, blood vessels. A polygonal mesh of an isosurface can be constructed from an identified grid cells and/or other anatomical structure using surface extraction algorithms. An input to a composition algorithm is a consolidated 3D grid output from a previous step.

Energy functional minimization approaches have been considered for a wide array of multidimensional processing and/or information extraction tasks, including edge-preserving smoothing volumetric reconstruction, general image restoration, image in-painting, curve evolution, and/or segmentation, among others. These individual applications each have specific energy formulations which define a properties of a resulting processed fields (any image and/or 3D volumetric image, e.g., is a field). Many known energy definitions are intended for processing of observations which are already reconstructed data (slices, images, and/or full 3D volumetric images). These energies, although not image reconstruction energies specifically, are important because they can be tied into an overall conglomerate energy, as defined below. Specific energy definitions with more and/or less limited scope of application are known and/or have been proposed for a number of different reasons, and/or include a number of different terms with different properties. By contrast, some configurations of aspects of the invention consolidate these terms into an overall conglomerate energy functional that has properties that are a function of all such terms, and/or at least of a plurality of specific energy definitions. For example, reconstruction algorithms previously have not been derived from material class decomposition constraints. Generally reconstruction algorithms have not been derived from an energy which contained at least one term that enforced an "N-ary" decomposition of an imaged volume—that is, a minimizer of a energy functional is an "N-ary" volumetric image.

The present invention introduces a new energy functional minimization scheme, which takes into account of vesselness of all 2D images for each 3D grid cell, the similarity of grayness of all 2D images for each 3D grid cell, and smoothness of vessel centerlines. Once the 3D volumetric image has been constructed, a marching cube algorithm will be applied to derive a polygonal mesh from the grid cells.

Background publications, such as U.S. Pat. No. 7,991,105, issued Aug. 2, 2011 (entirely incorporated herein by reference), builds 3D volumetric images based on special hardware and/or systems (e.g., rotational runs). Other 3D reconstruction methods, such as U.S. Pat. No. 6,047,080 issued on Apr. 4, 2000 (entirely incorporated herein by reference), are based on two standard views with a manual annotation process. The present invention uses multiple (e.g., >2 and/or >3) standard 2D x-ray and/or other radiation or sound imaging projections without a need for special hardware and/or systems (e.g., rotational runs) and/or pre-processing/analysis of a captured image data. When only two x-ray projections are available, the present invention still requires mandatory annotation data. Unlike U.S. Pat. No. 6,047,080, the present invention involves a much simpler annotation process without the need of specifying vessel diameters for each annotation point due to the aforementioned energy functional minimization scheme.

Procedure Simulation Cloud Service enables medical professionals to perform interactive training based on real patient data. During the simulation training session, the Procedure Simulation Cloud Service also actively monitors the performance of trainees. Using the metrics gathered overtime, additional services such as hospital accreditation can be offered.

The Procedure Simulation Cloud Service receives inputs from haptics devices that are connected to each medical simulator. The cloud service offers a programming interface (API) which allow different types of motion detectors and force feedback devices to communicate with the cloud server. This programming interface enables a wide varieties of hardware platforms and simulators to consume the procedure simulation cloud service, a service that is based on real patient data and physics-based modeling of interactions between virtual medical devices and patient 3D models. As an example, touch-based tablets or even Kinect controller could serve as a motion detector to allow physicians to insert catheters or to deploy stents using touch gestures. Similarly, a high-fidelity endovascular simulator could also be connected to the cloud platform, allowing medical professionals to manipulate real medical equipments in performing online-based simulations with real-time force feedbacks.

Background publications, such as U.S. Patent 9/800,104 issued on May 25, 2004 (entirely incorporated herein by reference), describes a simulation method and system based on distributive processing model used for training and educating healthcare teams. It allows multiple participants for individual team member roles at various connected simulation workstations. Those systems access predetermined data from knowledge repository, and web is primarily used for data storage, not for computation of interactions between virtual medical devices and patient 3D models. A unique aspect of the present invention is that all input devices are accessing real patient data on the cloud server, including 3D/4D patient data reconstructed directly from 2D angiographic images. In addition, the Procedure Simulation Cloud Service conducts intensive computation on the cloud server, taking full advantage of the scalability and vast computing resources offered by modern cloud technologies.

Background publications, such as U.S. patent Ser. No. 10/860,707 issued on Apr. 14, 2009 and U.S. Pat. No. 7,991,105 issued Aug. 2, 2011 (each entirely incorporated herein by reference), described methods of constructing and visualization of 3D images based on 2D projection images. Those systems didn't address the need of performing simulation procedures on the patient-specific 3D models before the actual operation. It should be noted that these procedures involve delicate and coordinated hand movements, and how to move surgical instruments inside the patient anatomy successfully is a major challenge: a mistake in this difficult environment can be dangerous. Our present invention enables medical professionals to realistically interact with the virtual patient in a safe environment, and even perform the simulation with peers or mentors in a remote location.

The aforementioned programming interface allows wildly different motion devices to communicate with the Procedure Simulation Cloud Service. An illustrative embodiment of a haptics device provides a physical interface for performing medical and/or vascular-access procedures. More particularly, a user inserts an end effector, which is representative of a medical instrument (e.g., a needle, catheter, etc.) into a base of a haptics device and/or manipulates it to simulate needle insertion, cannulation, etc. In some embodiments, a simulator is capable of sensing a orientation of a end effector. For example, in some embodiments in which a end effector is a needle and/or catheter and/or both, a simulator is capable of sensing a orientation of a beveled end of a needle and/or catheter.

In accordance with an illustrative embodiment, a haptics-device base includes a receiver that receives a end effector when inserted into a haptics-device base. In some embodiments, a receiver provides one linear degree of freedom and/or two, independent, rotational degrees of freedom (i.e., pitch and/or yaw). In an illustrative embodiment, a linear degree of freedom enables a user to advance a end effector into a haptics-device base. This mimics an insertion of a needle and/or catheter into a patient's arm. A rotational degrees of freedom enable a user to move an engaged end effector up and/or down and/or left and/or right. This mimics a freedom of movement that a user has during an actual medical and/or vascular-access procedure.

Sensors within a haptics-device base monitor a motion and/or position of a end effector (e.g., by measuring an insertion displacement and/or pitch and/or yaw angles of a receiver, etc.). A sensors generate signals indicative of a monitored activity and/or transmit a signals to a data processing system. The web-enabled data processing system processes an information acquired by a sensors. In conjunction with (i) a model of a medical instrument, such as a needle/catheter, and/or (ii) an anatomical model of at least a portion of an anatomy (e.g., human arm, etc.), a data processing system determines a effects (e.g., deformation, entry into a vein, etc.) of a user's manipulation of a needle/catheter on a surface and/or subsurface features of a body part on which a simulated medical and/or vascular-access procedure is being performed. A effects of a modeling are displayed by a simulator. A effects include, for example, a three-dimensional rendering of a body part of interest, a visual indication of a position of a needle/catheter relative to a body part, and/or a visual indication of how a needle/catheter affects that body part. Furthermore, in some embodiments, using a anatomical model and/or an information obtained from a sensors, the web-enabled data processing system determines a various resistive forces that would arise if a user were manipulating a needle and/or catheter through an actual anatomy (e.g., blood vessels, etc.). A data processing system determines a resistive forces to simulate penetration and/or contact with various surface and/or subsurface features of human anatomy (e.g., a skin, a vein, harder structures such as ligaments, bones, etc.) a resistance advantageously varies with insertion displacement and/or a pitch and/or yaw of a end effector because a resistance is determined based on an interaction of a medical instrument model and/or a anatomical model.

resistance that would be experienced by a user manipulating an actual needle/catheter through an actual anatomy is represented by a force-feedback profile. A force-feedback profile, in accordance with an illustrative embodiment of aspects of the invention, is based on an interaction of a medical instrument model and/or a anatomical model. In some embodiments, a force-feedback model is based on a puncture strengths and/or stiffnesses of a various surface and/or subsurface features of a human anatomy, as represented by a anatomy model.

A web-enabled data processing system provides control signals that are based on a force-feedback profile to a haptics device. A haptics device uses a control signals to generate a resistance experienced by a user of a simulation system.

In some embodiments, a web-enabled data processing system also tracks a progress of a haptics device user during a simulated procedure. Steps taken by a user are compared against a set of rules that are stored in a web-enabled data processing system. A assessment comprises critical points and/or non-critical points. A simulator displays a assessment results when a user completes a simulated procedure.

Patient Record Cloud Service

Many countries have put in place registry system (e.g. National Cardiovascular Data Registry by American College of Cardiology) because it is broadly recognized that they can be valuable. But almost all the existing registries have the following limitations:

They provide one or more aspects of lack of clinical decision support.

They provide one or more aspects of lack of incorporation of medical images.

They are usually voluntarily used and physician engagement is often weak.

They often have shortcomings, such as but not limited to, one or more of use paper records, require retrospective review of medical records, are cumbersome and difficult to input data, and have a limited IT backbone that is suboptimal. The data may be incomplete and error prone.

The quality of care assessments using benchmarking comes back to the physicians and hospitals as a report card but lacks guidance as to how to improve outcomes and reduce complications.

The data in the registry are often not used for other purposes. Business opportunities as well as some research initiatives are lost.

There is no standardization among countries that have a registry. Data are not interchangeable, comparable, or amenable to understanding important difference in patients around the world.

The present invention can provide in one or more aspects a Patient Record Cloud Service which incorporate patient medical images as well as the reconstructed 3D/4D models into data repositories. When a user uploads a collection of patient images to the cloud server, the raw patient images as well as the reconstructed 3D/4D data will be stored in the data repositories. With sufficient number of uploaded patient data, the Patient Record Cloud Service will be a potent research tool that permits focused analysis of clinical treatments, procedures, and outcomes of patients treated with medical procedures. Additionally, data collected can also be analyzed to assess compliance with clinical guideline recommendations, to assist in medical decision-making, to guide in-room procedures, and to assess the appropriateness of medical care provided for patients.

Figure 9:
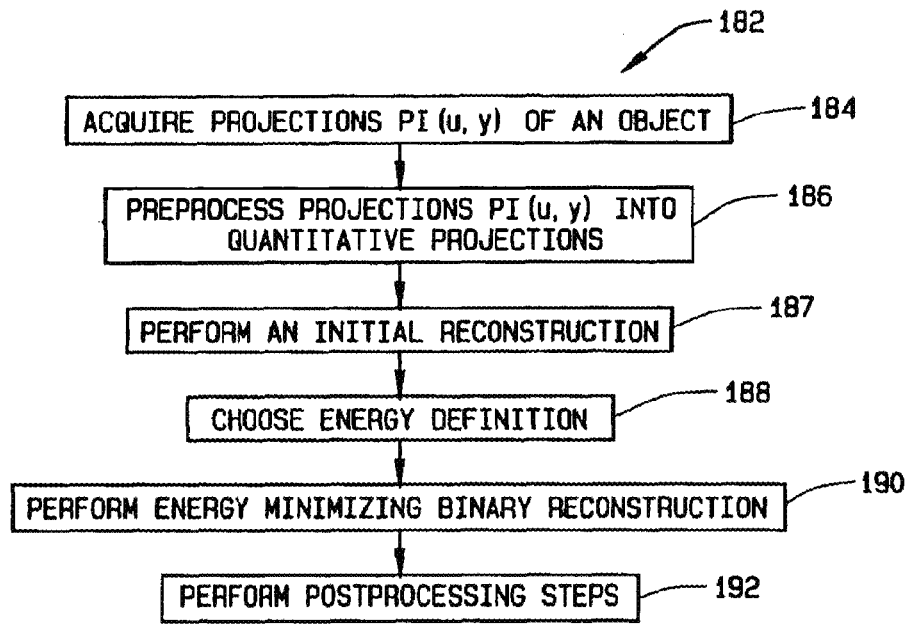
FIG. 9 is a flowchart illustrating yet another configuration of a volumetric image reconstruction method of aspects of the invention.

As used herein, a term "quantitative projections" refers to processed versions, qi(u,v), shown as 118 in FIG. 9, of a 2D image dataset, pi(u,v), shown as 102 in FIG. 9. A result of a processing is a set of projection radiographs, qi(u,v), where each pixel intensity in each projection radiograph indicates a percentage and/or amount (line integral, for example) of a material class along a ray corresponding to that pixel.

As used herein, a term "reprojections" refers to a projections obtained by applying a projection operator to an intermediate volumetric image in a reconstruction algorithm, where a projection geometry used in a computation of a reprojections is identical to a projection geometry that was used to acquire a corresponding original projection radiograph pi(u,v). For instance, Q(x, y, z) and/or B(x, y, z) may be "reprojected" to produce ri(u,v).

The terms "three dimensional (3D) volume" and/or "volumetric image" refer to a reconstructed 3D image of an object composed of voxels, which, in some of a examples herein, is a part of anatomy relevant for treatment and/or surgery. Volumetric images used herein include $\Delta T(x, y, z)$, $Q(x, y, z)$, $\Delta Q(x, y, z)$, $MC(x, y, z)$, and/or $B(x, y, z)$. In some development, a variable, v, may indicate a continuous volumetric counterpart to any of a voxelized volumes, $AT(x, y, z)$, $Q(x, y, z)$, $\Delta Q(x, y, z)$, $MC(x, y, z)$, and/or $B(x, y, z)$.

A term "part of anatomy relevant for treatment and/or surgery" and/or "air-tissue volumetric image" refers to a three dimensional space occupied by an imaged part of anatomy relevant for treatment and/or surgery (as distinguished from a space occupied by a air around a part of anatomy relevant for treatment and/or surgery). This concept translates correspondingly to other imaged objects as well. An air-tissue volumetric image is denoted $AT(x, y, z)$ herein.

A term "intermediate volumetric image" and/or "quantitative volumetric image" refers to any intermediate 3D representation of an imaged object. It may be a reconstructed volumetric image of material classes and/or a volumetric image of continuous-valued voxel intensities. An intermediate volumetric image is denoted $Q(x, y, z)$. If it is a first such intermediate volumetric image in a reconstruction algorithm used for, e.g., deriving volumetric image statistics, it is called an "initial volumetric image"; an initial volumetric image is denoted $Q0(x, y, z)$. Sometimes a volumetric update to an intermediate volumetric image is computed; these updates are denoted $\Delta Q(x, y, z)$.

A term "N-ary volumetric image" refers to any 3D representation of an imaged object in which each voxel assumes a value which is an intensity within a single material class, and/or a label corresponding to a single material class. An "approximately N-ary volumetric image" is similarly defined, but relaxes a constraint that all voxel values correspond to specific material classes, and/or allows a small fraction of a voxel values in a volumetric image to assume values that do not correspond to a material class. Both of these types of volumetric images are denoted $B(x, y, z)$.

The term "reconstruction" refers to a process of creating a 3D volume (volumetric image) from a set of projection images. A "reconstruction algorithm" may comprise one and/or more reconstruction steps, which may each be applied in isolation and/or in concert with other reconstruction steps. A reconstruction algorithm may also iterate any number of reconstruction steps in any appropriate order.

Digital radiation analysis, e.g., but not limited to, tomosynthesis, is a three-dimensional imaging technique in which typically only a few, e.g., 3 to twenty, projection radiographs are acquired at varying radiation source focal spot positions with respect to an imaged object and/or a radiation detector. In many configurations, a radiation tube is an x-ray tube and/or a radiation detector is, correspondingly, an x-ray detector. For simplicity, only x-ray imaging configurations are discussed herein, but configurations of aspects of the invention are not limited to a use of a particular type of radiation. One configuration of digital tomosynthesis for mammography is described by Niklason, et al. in U.S. Pat. No. 5,872,828, entirely incorporated herein by reference.

Figure 7:
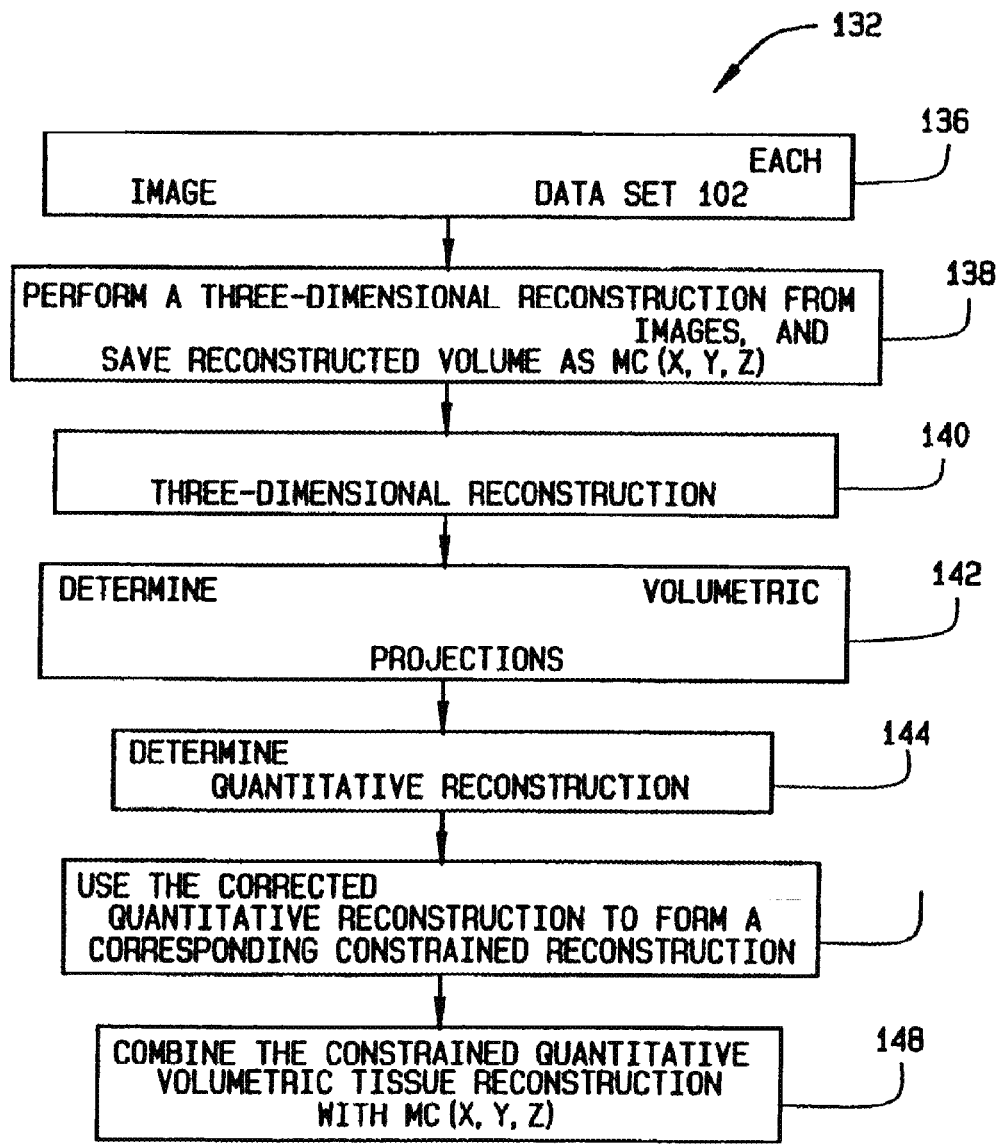
FIG. 7 is a flowchart illustrating a configuration of aspects of the invention useful for quantitative tissue reconstructions.

For example, and/or referring to FIG. 7, some configurations of digital imaging systems 10 of aspects of the invention comprise an x-ray tube 12 on a gantry arm 14. X-ray tube 12 projects radiation 16 towards an object 18 disposed between x-ray tube 12 and/or a detector array 20, which is used to acquire projection radiographs. Gantry arm 14 can remain stationary, provide sections, and/or rotate about a pivot point 22 to enable a plurality of projection radiographs to be obtained using different focal spot positions of x-ray tube 12. Digital imaging system 10 in some configurations also comprises a motor controller 24 to rotate gantry arm 14 around stationary and/or pivot point 22 and/or an image acquisition and/or processing device 26 that receives and/or processes a acquired projection radiographs. Also provided in some configurations is an x-ray controller 28 to control a operation of x-ray tube 12. A entire apparatus 10 in some configurations is under control of a computer 30 which is responsive to operator input, and/or a display device 32 and/or a printer may be provided in some configurations to display and/or print processed images of object 18. Although not shown in FIG. 7, archival mass and/or removable storage and/or a network connection to a public and/or private network may also be provided for acquired data and/or images. In various configurations, software and/or firmware is provided to configure computer 30 and/or image acquisition and/or processing device 26 to control motor controller 24, x-ray tube 12, detector array 20, display device 32, and/or display device 32 to acquire projection images of an object 18 (for example, a part of anatomy relevant for treatment and/or surgery) and/or to configure computer 30 and/or image acquisition and/or processing device 26 to perform procedures described below for reconstructing volumetric images and/or displaying a reconstructed volumetric images on display device 32 and/or elsewhere. In some configurations, a reconstructed volumetric images can be stored in a memory (not shown) and/or displayed at a later time.

Figure 8:
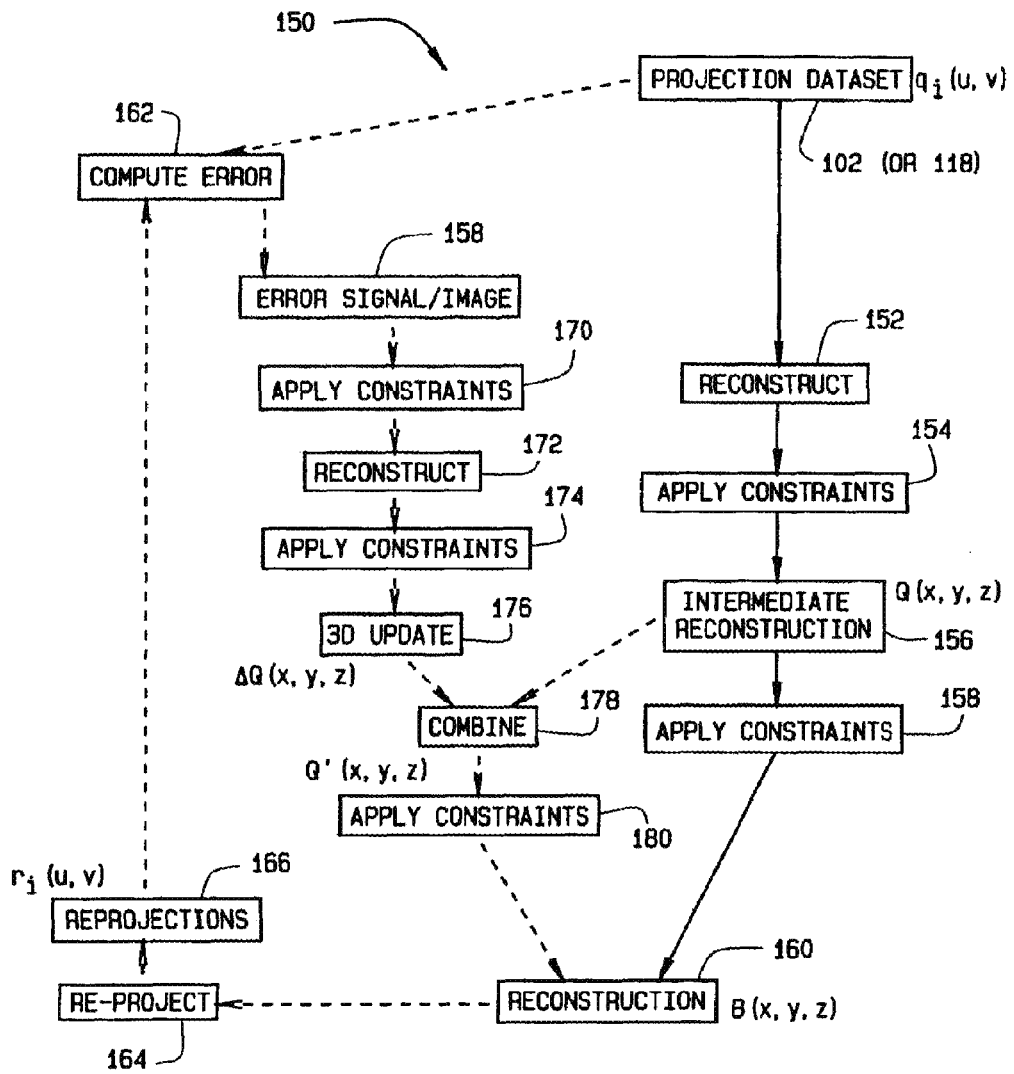
FIG. 8 is a flowchart illustrating a configuration of aspects of the invention in which an algorithmic reconstruction is used.
Figure 11:
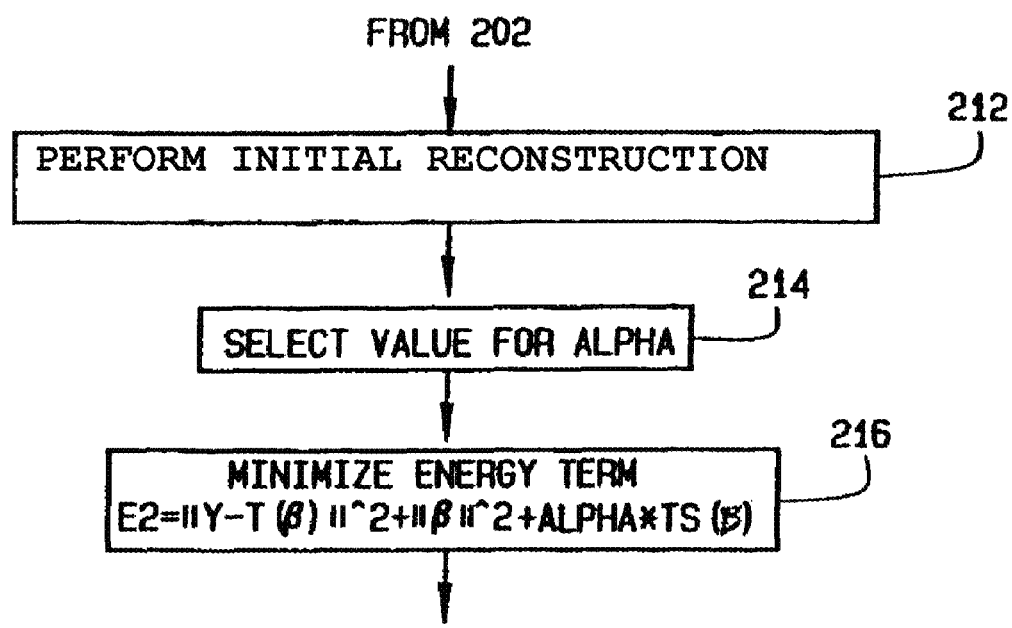
FIG. 11 is a flow chart representing a method of defining an energy minimization term, such as E2, and/or parameters of a energy minimization term that can be set using statistics gathered from an initial volumetric image.

A nominal geometry 34 of imaging system 10 of FIG. 7 for part of anatomy relevant for treatment and/or surgery imaging is illustrated in FIG. 11. As viewed from arrow in FIG. 7, radiation detector 20 and/or imaged object 18 (in this configuration, a part of anatomy relevant for treatment and/or surgery) are assumed to be stationary, while x-ray tube 12 attached to gantry arm 14 can be stationary, can provide serial sections, and/or rotates around pivot point 22 along a trajectory 36 to acquire projection images from different views. In FIG. 8, three focal spot positions are shown from which projection images can be obtained, namely, focal spot position 38, focal spot position 40, and/or focal spot position 42. More typically, however, two and/or more projection radiographs are acquired at varying positions, not all of which are separately represented in FIG. 8.

In some configurations of imaging system 10, gantry pivot point 22 is located above detector 20, and/or a distance from focal spot 38 (and/or other focal spots) to pivot point 22 is optimized for one and/or more of stationary, provide sections, and/or rotational sections, as projected into one and/or more planes, e.g., as shown in FIG. 8. A sectional and/or angular range of gantry arm 14 can include 0 degrees, and/or for rotational sections, e.g., from −25° to +25° degrees, including using 0 degrees for regular radiation 2D imaging, relative to a vertical position of gantry arm 14, exemplified in FIG. 8 by focal spot position 38. Other configurations may include, for example, a moving detector, multiple detectors, multiple x-ray sources, and/or so forth.

In some configurations, 2 and/or more (e.g., 2 and/or 3 and/or more) 2D projection radiographs are acquired, for x-ray tube 12 positions covering a sectional and/or angular range (including using 0 degrees for non-rotation images) of gantry arm 14, in 1-15° increments, e.g., 5 degrees. This set projection radiographs is referred to herein as a 2D image dataset. Using a 2D image dataset, image processor 26 and/or computer 30 can reconstruct a volumetric image representative of a 3D characteristics and/or structure within a full three-dimensional volume of imaged object 18 using an appropriate reconstruction algorithms, e.g., through a use of image analysis that can include one and/or more algorithms selected from one and/or more of projection, composition and/or extraction algorithms that convert 2 and/or more and/or 3 and/or more 2D images to 3D and/or 4D images. Image processor 26 and/or computer 30 are not necessarily separate components. Various different reconstruction algorithms are known and/or as described herein. These known reconstruction algorithms have different performance characteristics related to image quality (e.g., contrast, artifacts and/or noise) and/or to computational requirements (e.g., memory, speed). See, for example, Kak, et al., "Principles of Computerized Tomographic Imaging," IEEE Press, 1988. Configurations of aspects of the invention for quantitative volumetric and/or 4D image reconstruction are not limited to an imaging system geometry as described in FIG. 8. In particular, quantitative radiation image reconstruction configurations of aspects of the invention can be used in other, more general situations, where a goal is to reconstruct quantitative three-dimensional information about an imaged object from relatively few projection radiographs. More particularly, in some configurations of aspects of the invention, various reconstruction algorithms known in a art can be used to estimate an initial three-dimensional volumetric image 112 and/or 124 in FIG. 8, for example, that is then further processed and/or iteratively updated according to aspects of the invention.

A part of anatomy relevant for treatment and/or surgery consists almost entirely of two distinct material classes of tissues, namely any tissue or vessel and/or glandular-like tissue (i.e., radiographically equivalent to fibrotissue). A very small fraction of a part of anatomy relevant for treatment and/or surgery may consist of calcium salts in very small quantities, usually termed "target tissue component or vessel and/or medical device or treatment." Although configurations of aspects of the invention are described herein that deal with all three types of part of anatomy relevant for treatment and/or surgery, some configurations focus on fatty and/or glandular-like tissues. These two tissues have distinct x-ray attenuation spectra, making it possible, in one embodiment, to compute a quantitative projection image by decomposing a part of anatomy relevant for treatment and/or surgery x-ray projection radiograph into relative amounts of fatty and/or glandular-like tissue at each image pixel. Such a decomposition is made possible using additional information, which, in some configurations, includes system 10 calibration data, part of anatomy relevant for treatment and/or surgery thickness, and/or x-ray technique information. Cancerous lesions have attenuation properties that are very similar to normal tissue, and/or which can therefore be accommodated with a two-tissue configuration, wherein a lesions appear glandular-like. On a other hand, target tissue component or vessel and/or medical device or treatment represent an exception to a two tissue composition assumption in that target tissue component or vessel and/or medical device or treatment include highly attenuating material (namely, calcium salts) having very different radiographic properties than either fatty and/or other soft tissue. However, because target tissue component or vessel and/or medical device or treatment are typically very small, covering only a few pixels in a projection image, their effect on quantitative imaging is very limited. Further, specific methods have been developed to detect and/or compensate for local "outliers" caused by target tissue component or vessel and/or medical device or treatment, as known in a art and/or as described herein.

In configurations of aspects of the invention, prior knowledge about object 18 (e.g., for a part of anatomy relevant for treatment and/or surgery as object 18, a underlying anatomy and/or its x-ray properties, maybe in combination with other, additional information described herein below and/or as known in a art) is used to arrive at a reconstructed volumetric image that quantitatively reflects a actual composition of object 18 in terms of a specified set of material classes assumed and/or hypothesized to comprise most of a volume of object 18, as well as positional information, which can further include positional information about medical instruments and/or treatments. A volumetric image that is a output of a reconstruction is referred to as either "essentially N-ary" and/or "approximately N-ary." By "essentially N-ary" and/or "approximately N-ary" (and/or other similarly qualified "N-ary" volumetric images), it is meant that most of a voxel values in a reconstructed volumetric image correspond to exactly one of a set of a selected number N (where N is two and/or more) material classes assumed and/or hypothesized to comprise most of a volume of object 18. A smaller portion of a reconstructed volumetric image of a object may and/or may not be labeled as one and/or a small number of other hypothesized material classes that comprise a remaining part of a volume of object 18. If all of a composition of a reconstructed volumetric image of a object is represented by voxels exclusively from a set of N material classes, a construction is referred to as "strictly N-ary." An "N-ary volumetric image" with no other qualifications includes within its scope both approximately N-ary volumetric images and/or strictly N-ary volumetric images. For N=2, a volumetric image is called "binary".

In some configurations and/or referring to flow chart 100 of FIG. 9, a method useful for reconstructing quantitative three-dimensional volumetric images of objects (e.g., part of anatomy relevant for treatment and/or surgery) comprises a plurality of steps, some of which are optional and/or some of which may be satisfactorily performed using any of a plurality of different methods. It is also not necessary in all configurations of aspects of the invention to perform all of a steps of flow chart 100 in a exact sequence shown in FIG. 9. A technical effect of apparatus 10 (or other apparatus configurations of aspects of the invention) is achieved by a user operating a apparatus to acquire, at 104, a 2D image dataset 102 that comprises a set of projection radiographs 106 of an object 18, such as a part of anatomy relevant for treatment and/or surgery, from a same and/or different projection angle s and/or sections and/or reconstructing a volumetric image of an imaged object from a projection images.

The result of a decomposition of a projection radiograph image, into its fatty and/or glandular-like, and/or other soft and/or hard tissue components, is a new image and/or set of images for each x-ray projection radiograph. A new image and/or set of images, for example, capture one and/or more of a position, percent tissue and/or a associated height of a tissue. These new images are referred to as quantitative projections. This approach to quantitative projection imaging is described by Kaufhold et al., "A calibration approach to tissue composition estimation in digital mammography," Med. Phys. 29(8), August 2002, pp. 1867-1880. See also published U.S. patent application Ser. Nos. 2003/0072417, "Method and/or apparatus for calibrating an image system," and/or 2003/0072409, "Methods and/or apparatus for estimating a material composition of an imaged object," which are entirely incorporated herein by reference.

In some configurations, a projection images that are part of a 2D image dataset 102 are, and/or are assumed to be, scatter-free and/or have had appropriate corrections made for imaging physics and/or acquisition electronics. Such scatter correction, imaging physics corrections, and/or corrections for imaging electronics are described elsewhere. For example, see Gonzalez Trotter, et al., "Scatter Correction in Tomosynthesis Imaging for Mammography," 6th International Workshop on Digital Mammography, 2002, and/or Gonzalez Trotter, et al. "Thickness-dependent scatter correction algorithm for digital mammography," SPIE, as well as U.S. Pat. No. 6,633,626, "Methods and/or apparatus for correcting scatter," and/or U.S. Patent Application Publication No. 2003/021507, "Scatter correction method for non-stationary x-ray acquisitions" (each entirely incorporated herein by reference).

Additional information that may be provided as a result of processing of a 2D data set using various algorithms, e.g., projection, composition and/or extraction, relevant 3D and/or 4D volumetric images are provided, including real time positioning of both tissue to be treated, as well as associated medial devices and/or treatments. A decomposition and/or other suitable processing of a projection images includes an indicator of a part of anatomy relevant for treatment and/or surgery region, an indicator for a part of anatomy relevant for treatment and/or surgery edge, and/or summary composition statistics. More specifically, a part of anatomy relevant for treatment and/or surgery is an image region in which a part of anatomy relevant for treatment and/or surgery is oriented with a detector 20, such that x-rays pass through tissue relevant for imaging. A part of anatomy relevant for treatment and/or surgery edge is a contour in a projection images defined by a part of anatomy relevant for treatment and/or surgery.

A part of anatomy relevant for treatment and/or surgery edge is a boundary of a region of a projection radiograph in which x-ray beam 16 passes through some amount of tissue. Indicators for part of anatomy relevant for treatment and/or surgery region, and/or part of anatomy relevant for treatment and/or surgery edge, are essentially curves separating two image regions from each other. These indicators can be generated in a form of an image, and/or any other appropriate form. From a decomposition of a projection radiograph, other additional parameters can be computed. For example, a composition "summary statistics" include useful global information about a part of anatomy relevant for treatment and/or surgery, such as overall part of anatomy relevant for treatment and/or surgery composition.

Thus, in at least some configurations, but not necessarily all configurations, "pre-processing so that processed projection images are quantitative" is related to determination steps concerning a line-integral of a attenuation coefficient, and/or a composition along a ray. In some configurations, analytical expressions rather than calibration curves are used to perform these steps.

In one configuration of aspects of the invention, a generation of quantitative projection images from a 2D image dataset follows a similar procedure as for a standard two-dimensional quantitative composition estimation for standard mammograms discussed above, and/or an image include a same information as in standard projection imaging. However, in processing 2D image datasets, a system geometry change from view to view can be taken into account.

In some configurations, a part of anatomy relevant for treatment and/or surgery thickness and/or 2D image dataset 102 are input to a quantitative reconstruction at 104. 2D image data is assumed to be scatter-free and/or appropriately corrected for imaging physics and/or acquisition electronics effects. In some other configurations, an image are normalized such that, for each pixel, an average attenuation along a path of a corresponding ray of radiation is indicated, with reference to an assumed object 18 of a fixed thickness, corresponding to a part of anatomy relevant for treatment and/or surgery thickness. An indicator of a projected edge of an imaged part of anatomy relevant for treatment and/or surgery, and/or an indicator for a part of anatomy relevant for treatment and/or surgery region may also be provided. A global part of anatomy relevant for treatment and/or surgery composition metric for at least one of an image in 2D image dataset 102 may be provided, as well as other "summary statistics." Furthermore, additional information about a part of anatomy relevant for treatment and/or surgery shape may be available through another sensor. For example, a camera (not shown in Figures) can be used to provide information about a shape of a part of anatomy relevant for treatment and/or surgery in a part of anatomy relevant for treatment and/or surgery region. This information may also be provided as additional input.

From 2D image dataset 102, an estimate of a geometry of a three-dimensional volume that contains part of anatomy relevant for treatment and/or surgery (i.e., some amount of fatty and/or material) is determined at 108. This estimate is a description of a physical object shape and/or location in three dimensions, and/or is referred to as a Part of anatomy relevant for treatment and/or surgery Volumetric image. This estimate produces an air/tissue volumetric image of an imaged volume at 110, AT(x, y, z), where AT(x, y, z) is "1" where (x, y, z) coordinates are at a point "inside" a part of anatomy relevant for treatment and/or surgery (tissue), and/or AT(x, y, z) is "0" where (x, y, z) coordinates are at a point "outside" a part of anatomy relevant for treatment and/or surgery (air). AT can have other representations as well. For example, AT can be represented as a surface that separates part of anatomy relevant for treatment and/or surgery from a surrounding space and/or air. Either representation has substantially a same information with respect to a part of anatomy relevant for treatment and/or surgery, AT(x, y, z). That is, a surface model for a part of anatomy relevant for treatment and/or surgery can be used to derive a volume, AT(x, y, z), and/or AT(x, y, z) can be used to derive a surface model of a part of anatomy relevant for treatment and/or surgery, i.e. A surface that separates space and/or air from a part of anatomy relevant for treatment and/or surgery. A air/tissue volumetric image 112 can be determined from a projection images, and/or from additional information (e.g., compression paddle readout, and/or additional sensor), and/or a combination thereof.

In some configurations, part of anatomy relevant for treatment and/or surgery, AT(x, y, z), which is a model of a three-dimensional geometry of a surface of an imaged part of anatomy relevant for treatment and/or surgery, is reconstructed first for steps 108 and/or 110. This reconstruction may be accomplished, for example, by performing a preliminary three-dimensional reconstruction in conjunction with an N-ary quantization (e.g., (air, tissue) binary quantization). Reconstruction methods that incorporate information about a detected part of anatomy relevant for treatment and/or surgery edge (e.g., skinline) in at least one of an image in 2D image dataset 102 may be used for this purpose. Likewise, smoothness constraints for a 3D skinline may be incorporated into a N-ary volumetric image. If available, additional information about a part of anatomy relevant for treatment and/or surgery shape which may be available from some other sensor (a camera, e.g.) may also be used to constrain a N-ary volumetric image of a part of anatomy relevant for treatment and/or surgery. A part of anatomy relevant for treatment and/or surgery, and/or air/tissue volumetric image, AT(x, y, z), is therefore a three-dimensional mask for a part of anatomy relevant for treatment and/or surgery that describes an interior and/or a exterior of a part of anatomy relevant for treatment and/or surgery.

The air/tissue reconstruction (or substitute methodology) is not required in all configurations of aspects of the invention. In some configurations, a reconstruction of a part of anatomy relevant for treatment and/or surgery at 108 and/or an interior structures of a part of anatomy relevant for treatment and/or surgery at 122 are performed simultaneously in a single processing step.

From air/tissue volumetric image 112, a x-ray path lengths through tissue (i.e., a path lengths through a volume defined by AT(x, y, z)) for each projection radiograph in a 2D image dataset are determined at 114. From these path lengths and/or 2D image dataset 106, an estimate of a percentage of part of anatomy relevant for treatment and/or surgery composition is determined at 116 for each projection radiograph. To convert 2D image dataset 102 into a quantitative percentage projection dataset 118, previously-acquired, and/or otherwise pre-determined, calibration curves are used to estimate a relative amounts of individual tissue composing each pixel in each projection radiograph. A resulting images are referred to as quantitative projection estimates 118, and/or qi(u,v). That is, a quantitative percentage projection estimates are no longer simply intensities, but rather measured amounts of tissue along a ray corresponding to an x-ray incident on a pixel. Furthermore, from these quantitative percentage projection estimates, a summary statistic for a overall percentage tissue may be determined for a plurality of x-ray projection radiographs.

In yet another configuration, a preprocessing step is applied to 2D image dataset 102 that compensates for a effect of reduced tissue thickness near a skinline. This preprocessing step, referred to as "thickness compensation" for two-dimensional projection images, proceeds as though any tissue or vessel were added in a regions of reduced thickness so as to achieve a full thickness. This step circumvents a three-dimensional part of anatomy relevant for treatment and/or surgery reconstruction, and/or a quantitative reconstruction based on these preprocessed images will generally generate reliable tissue characteristic estimates at any location within a volume of an imaged part of anatomy relevant for treatment and/or surgery (i.e., a part of anatomy relevant for treatment and/or surgery). In other configurations, and/or in addition to thickness compensation, in a region in which x-rays do not pass through any part of anatomy relevant for treatment and/or surgery, a projection images are modified as though a x-rays and/or other radiation pass through a full thickness of any tissue or vessel.

In some configurations, quantitative projections 118 are obtained by first computing a projection ray path length through a part of anatomy relevant for treatment and/or surgery (i.e., a volume defined by a part of anatomy relevant for treatment and/or surgery AT(x, y, z)) for each pixel in each projection image, and/or then determining a quantitative projection using appropriate calibration curves for a corresponding tissue thickness. Also in some configurations, a part of anatomy relevant for treatment and/or surgery AT(x, y, z) determination at 108 and/or 110 is not determined first, but rather assumptions about a shape of a part of anatomy relevant for treatment and/or surgery in a region (e.g., a model of a thickness as a function of a distance from a skinline and/or a compressed thickness) are used to generate a quantitative projections directly. In these configurations, a determination of a part of anatomy relevant for treatment and/or surgery is not required for a generation of a quantitative projections 118. In other configurations, projection images 104 are normalized such that, for each pixel, a average attenuation is indicated. This average attenuation is referenced to a path length through a volume of constant thickness. A average attenuations are used directly as input for reconstruction at 120.

Using a set of quantitative projections 118, one step of a reconstruction algorithm may be used at 120 to estimate intensities in a part of anatomy relevant for treatment and/or surgery, i.e., inside a three-dimensional volume defined by AT(x, y, z). More particularly, a reconstructed intermediate volumetric image, Q(x, y, z), takes on non zero values only where AT(x, y, z) is "1" at 122. This volumetric image, Q(x, y, z), referred to herein as a quantitative volumetric image of a part of anatomy relevant for treatment and/or surgery in a part of anatomy relevant for treatment and/or surgery, corresponds to intensity values (typically estimated attenuation values) inside a part of anatomy relevant for treatment and/or surgery estimate, AT(x, y, z) 124. Similarly, with known reconstruction algorithms, a quantitative volumetric image of a part of anatomy relevant for treatment and/or surgery in a part of anatomy relevant for treatment and/or surgery 124 takes on numerical intensity values between intensities which correspond to all and/or all any tissue or vessel for a given voxel, suggesting that at certain locations within a part of anatomy relevant for treatment and/or surgery, a structure is mixed. However, a part of anatomy is distinct. That is, ignoring partial volume effects, at any given (x, y, z) coordinate, an intensities in an N-ary volumetric image of an imaged part of anatomy relevant for treatment and/or surgery 130, for example, are either fatty and/or glandular. In various configurations of aspects of the invention, a quantitative volumetric image is configured to reflect that fact. Thus, in some configurations of aspects of the invention, an N-ary voxel constraint is applied at 126 to a quantitative volumetric image, Q(x, y, z) so that a volumetric image at any voxel is, for example, either fatty or tissue. For example, a volumetric image is an N-ary volumetric image that labels tissue "2" and/or any tissue or vessel "1" at every voxel in a volumetric image, rather than labeling voxels as a mixture of material classes corresponding to mixtures of tissue. To arrive at an N-ary volumetric image from a quantitative volumetric image, in some configurations of aspects of the invention, a plurality of constraints are applied to a reconstructed volume at 126. A constraint set, for example, can include a plurality of models that constrain a anatomical morphology, intensities, and/or summary statistics of a quantitative volumetric image determined at 122. An individual constraints and/or a constraint set is discussed in more detail herein below, and/or in combination with what is known in a art. At step 128, a constraint set is used to map a continuous voxel intensities in a volumetric image to intensities of a constrained (e.g., essentially N-ary) quantitative reconstructed volume 130. A separate processing step 132 may be used to separately generate a three-dimensional volumetric image of target tissue component or vessel and/or medical device or treatment contained in a part of anatomy relevant for treatment and/or surgery. This additional information in some configurations is injected into N-ary reconstructed volume 130 of a part of anatomy relevant for treatment and/or surgery. In some configurations of aspects of the invention, N-ary quantitative reconstructed volume 130 is checked at 134 for consistency against a data (e.g., a quantitative percentage projection estimates), itself, which represents another constraint. This consistency check can be used to update AT(x, y, z), a part of anatomy relevant for treatment and/or surgery estimate 124, and/or to iteratively update a reconstructed quantitative volumetric image in a part of anatomy relevant for treatment and/or surgery, Q(x, y, z), as indicated by a arrows in FIG. 9.

Referring to a details of step 186 provided in a flow chart of FIG. 9, in some configurations, a scatter correction is performed at 196 on a acquired projections. Quantitative projections (e.g., but not limited to, percentage vs. percentage fat) are determined at 198 using calibration curves. Composition summary statistics may be computed. Specifically, an average percent tissue for each projection, % $G_i$, is determined at 200, and/or an average percent tissue over all projections, % Gmean, is determined at 202 in accordance with an expression which can be written as % Gmean=(% G1+% G2+% G3+ . . . +% Gn)/n. In other configurations, % $G_i$ is determined for only a subset of a projection images, and/or only for a region of interest (ROI) within a projections. Neglecting boundary effects, an overall composition % $G_i$ is constant across different projection images. Thus, a value from a single projection image can be used in some configurations. In yet another configuration, quantitative projections are obtained by using an analytic approach, which may be used in combination with a pre-processing step for scatter correction.

In some configurations, and/or referring to FIG. 7, an initial estimate of a quantitative volumetric image of a part of anatomy relevant for treatment and/or surgery, Q, is reconstructed at 204, for example, via filtered back projection and/or some other reconstruction algorithm of a prior art, and/or using one and/or more algorithms described herein, e.g., projection, composition, and/or extraction. Using a suitable method, for example, thresholding and/or a method using a three-dimensional morphology, determine an updated air-tissue volumetric image, AT, from Q at 206. This determination is performed in some configurations by thresholding a volumetric image to separate voxels corresponding to tissue from voxels corresponding to air. From a distribution (e.g., histogram) of voxel intensities in Q that are also located within a part of anatomy relevant for treatment and/or surgery (i.e., where AT indicates that a voxel corresponds to tissue), a threshold TG is determined at 208 such that a number of voxels in Q (restricted to a space where AT indicates tissue) above a threshold divided by a total number of voxels in AT is % G mean/100. In some configurations, a threshold TG is determined as a function of a composition in a single projection, and/or a corresponding subvolume of a part of anatomy relevant for treatment and/or surgery AT that is projected onto a detector for that projection is used as a reference volume for a determination of that threshold. Then, voxel values in Q, for voxels that are located within a part of anatomy relevant for treatment and/or surgery AT, similarly, are compared to threshold TG at 210. Those above a threshold are assigned to 1, while those below it are assigned to zero. A resulting volumetric image is improved iteratively in some configurations, e.g., by using an approach similar to that shown in FIG. 11. These values 0 and/or 1 are examples of labels that can be used for a different material classes corresponding to any tissue or vessels and/or equivalent tissue, respectively. Other labels and/or values may also be used.

Thus, some configurations of aspects of the invention can comprise a method that uses a 2D image dataset 106 together with additional information (e.g., calibration curves, part of anatomy relevant for treatment and/or surgery thickness, and/or x-ray technique) to determine a three-dimensional and/or four dimensional volumetric image of an imaged volume. A reconstructed volumetric image of an imaged volume is represented as a set of voxels with distinct values and/or labels (e.g., air/background, any tissue or vessel, tissue, and/or calcification) that satisfy and/or arbitrate among a set of constraints, for example, re-projection consistency with a 2D image dataset. More specifically, when determining a projection image from a three-dimensional N-ary reconstructed volume dataset (maybe after an appropriate mapping from labels to quantitative values), for one of a projection geometries as used for a data acquisition, a resulting re-projection image is constrained to be essentially identical to a corresponding projection image in a original 2D image dataset.

In some configurations, it is not necessary to input quantitative 2D image data to a reconstruction algorithm. Instead, in some configurations, it is sufficient to have a good estimate of a corresponding relative linear attenuation coefficients of a different tissue types as information used to develop a constraint set.

In some configurations, algorithms for reconstruction as described herein and/or known is applied to a quantitative 2D image dataset at 120 and/or 122 as one and/or more steps for reconstruction according to an invention. This step and/or steps of one and/or more reconstruction algorithms can use any suitable known reconstruction algorithm(s) that accept a 2D image dataset as input and/or uses a dataset to reconstruct an estimate of a volumetric image of a object that produced a projection images. In some configurations of aspects of the invention, a projections are two-dimensional projections and/or a volumetric image reconstructions are three-dimensional and/or four-dimensional reconstructions of an imaged part of anatomy relevant for treatment and/or surgery. In some configurations of aspects of the invention, one step of a reconstruction algorithm does not produce a volumetric image that corresponds to $Q(x, y, z)$ and/or $B(x, y, z)$, per se, but rather, incremental changes to these volumetric images, updates $\Delta Q(x, y, z)$ and/or $\Delta B(x, y, z)$.

Some reconstruction methods, for example, filtered back projection, require a preprocessing step (e.g., filtering) before a three-dimensional dataset (volumetric image) is formed. Through this preprocessing step some constraints of a quantitative projection images (or quantitative percentage estimate 118) may be violated, and/or it may be useful in some configurations of aspects of the invention to correct for this type of inconsistency before performing a final reconstruction step. For example, in a filtered back projection reconstruction method, each projection image is first high-pass filtered and/or then backprojected. A filtering step can potentially introduce very high and/or very small values (greater than 100% and/or smaller than 100% fat). Some configurations of aspects of the invention therefore round and/or threshold these outliers to a nearest admissible value to improve a volumetric image. In some configurations, a reconstructed volumetric image is constrained to an interior of a part of anatomy relevant for treatment and/or surgery.

The volumetric images produced by a reconstruction algorithm may be constrained more generally to produce a "constrained volumetric image". Common to all constrained volumetric images in aspects of the invention is at least one constraint that enforces an N-ary and/or approximately N-ary material class decomposition in $B(x, y, z)$. A constraints used to produce a constrained volumetric image may also include 1) constraints on a shapes of structures of specific material classes within a volumetric image, $B(x, y, z)$; 2) constraints on a number of voxels corresponding to a specific material class in a volumetric image; and/or 3) constraints on a connectedness of materials within a volumetric image, $B(x, y, z)$. An example of connectedness is, for example, a six and/or twenty-six connectedness of a sets of voxels of a same material class in a volumetric image, $B(x, y, z)$.

In some configurations, a reconstruction step simultaneously reconstructs interior structures of a part of anatomy relevant for treatment and/or surgery (i.e., its three-dimensional shape and/or location). In these configurations, additional information, such as a part of anatomy relevant for treatment and/or surgery edge (projected skinline) as detected in 2D image dataset 106, can be used in a reconstruction. In some configurations, this additional information is used in conjunction with smoothness constraints and/or other constraints. This simultaneous reconstruction of a geometry and/or a three-dimensional interior part of anatomy relevant for treatment and/or surgery structure lends itself to an iterative update, as described below, in which at each step, a anatomy feature geometry as well as a reconstruction of a part of anatomy relevant for treatment and/or surgery is improved.

Some configurations of aspects of the invention do not use a reconstruction constraint to map a quantitative volumetric image to an approximately N-ary volumetric image, i.e., a output volumetric image $B(x, y, z)$ is a same as an input volumetric image $Q(x, y, z)$.

In some configurations, an initial volumetric image 124 of a object is iteratively improved, by applying subsequent processing steps to an initial volumetric image 124. At any iteration, either no constraints at all and/or a plurality of constraints such as those described below are applied in some configurations. Some constraints can be more useful than others at specific points in a quantitative reconstruction. However, in configurations in which constraints are applied, a constraint and/or constraints comprise at least one constraint selected from those that follow, and/or may depend on a application sought to be accomplished and/or a specific step and/or iteration in a configuration.

One useful reconstruction constraint is a constraint in a volumetric extent of a volume defined by a air/tissue volumetric image. This constraint may be an integral part of a reconstruction step, and/or it may be used as a separate constraint. This constraint may be incorporated jointly with another reconstruction step, such as joint estimation of $Q(x, y, z)$ and/or $AT(x, y, z)$, and/or it may be performed as a "masking" operation, where, for instance, a reconstruction step constrains $B(x, y, z)$ and/or $Q(x, y, z)$ to be "0" except where $AT(x, y, z)$ is "1".

Another useful constraint is to quantize in such a way that a "constrained volumetric image" is produced, e.g., such that a composition (i.e., material class membership of voxel values) of a volumetric image $B(x, y, z)$ matches a total percent summary statistic obtained from a quantitative projections. Both a volumetric extent as well as a material class membership constraint are specific constraints that can be used separately and/or together to improve a reconstructed volume. In general, a number of constraints can be combined into a constraint set. Even a projection images that are used as input for a reconstruction step can be viewed as constraints. A specific form of a "constraint set" which produces a "constrained reconstruction" may be any information and/or processing which injects additional information in a process of reconstruction from projections.

Some configurations of aspects of the invention enforce constraints by modifying a first (intermediate) volumetric image (initial volumetric image and/or intermediate volumetric image, for example) that was previously computed without being subject to a set of constraints. However, in some configurations, these constraints are built directly into a reconstruction step. In other configurations, a number of subsequent steps in a reconstruction algorithm may impose constraints on a reconstructed volume, wherein each step may impose one and/or a combination of two and/or more constraints in a reconstructed volume, and/or different steps may include different sets of constraints. Also, each step may only improve a degree to which a set of constraints is satisfied, and/or not strictly impose that constraint. In some cases, a formal definition of a reconstruction energy can be used to arbitrate among conflicting constraints.

Elements of such constraint sets can include, but are not limited to:

Quantization of voxel intensities in a 3D volumetric image, wherein a threshold is chosen. Methods to choose a threshold include, but are not limited to (a), (b) and/or (c) below:

Determining a threshold using first principles of imaging physics (for example, attenuation coefficients). For example, a threshold is chosen halfway between a target quantization values. In some configurations, for an intensity value, x, between an expected intensities for each of a "fat" and/or "glandular" tissues, a voxel is set to "fat" if x is less than ½("fat"+"glandular"), and/or to "glandular" otherwise.

Determining a summary statistic from at least one projection image, and/or using these summary statistics, choosing a threshold that matches a same summary statistic of a 3D volumetric image. A summary statistic can be any metric, which for example may include, but are not be limited to, a total percent summary statistic and/or a gray level integral in a attenuation value domain. For example, if a global composition of an imaged part of anatomy relevant for treatment and/or surgery was determined to be 40% glandular, then a threshold for quantization is chosen such that 40% of a candidate "fat" and/or "glandular" voxels are quantized to glandular. A proper threshold can be determined, for example, from a histogram of voxel values in a (non-quantized) volumetric image Q(x, y, z). Using more than one constraint of a similar nature allows accurate adjustment of several quantization thresholds (e.g., threshold air/any tissue or vessel, and/or threshold any tissue or vessel/tissue).

Re-projecting a previously reconstructed 3D volumetric image Q(x, y, z) at all acquisition angles and/or choosing one threshold that best matches summary statistics between original 2D image dataset 102 and/or re-projections of a reconstructed 3D volume.

Morphological constraints, such as size and/or shape of connected regions of voxels, that may require a 3D structures in a N-ary volumetric image to resemble more closely a anatomical properties of a real part of anatomy relevant for treatment and/or surgery. These constraints may include, but are not limited to, (a) and/or (b):

Relabeling (for an intermediate quantized B(x, y, z)) and/or adjusting voxel intensities (for a non-quantized Q(x, y, z)) where isolated pixels and/or small groups of pixels differ from their background volumes in some neighborhood. For example, a single isolated voxel of tissue is not expected within a larger volume that is all any tissue or vessel. Other anatomical prior knowledge can be used to allow and/or disallow certain structures within a reconstructed volumetric image.

Some reconstruction threshold choices and/or relabeling choices may make certain structures too large and/or too small. These structures can be altered in intensity, size and/or shape characteristics by standard volume processing techniques, e.g., using mathematical morphology.

Constrained volumetric image 130, B(x, y, z), can take on a number of different forms depending on a particular constraint set applied to a quantitative volumetric image at 128 that produced it.

In one configuration, each voxel is assigned a label based on material classes chosen in a constraint set. For example, for tissues, air, fat, and/or labels, a form of a volumetric image can be an indexed set of three labels. In configurations in which a volume containing any tissue or vessel is constrained to a part of anatomy relevant for treatment and/or surgery, AT(x, y, z), a form of B(x, y, z) can be an indexed set of only two values, fat and/or glandular. If target tissue component or vessel and/or medical device or treatment are included in B(x, y, z), there can be two, three, and/or four labels. For example, in one labeling scheme, if B(x, y, z) is already constrained to exist in only a part of anatomy relevant for treatment and/or surgery, a form of B(x, y, z) may comprise labels for only soft tissue (fat and/or glandular) and/or target tissue component or vessel and/or medical device or treatment. In other configurations, specific soft tissue distinctions are also designated within a part of anatomy relevant for treatment and/or surgery using labels that designate fat, glandular, and/or target tissue component or vessel and/or medical device or treatment. Some configurations use only labels, exclusively. For example, air, fat, and/or target tissue component or vessel and/or medical device or treatment labels are used in a single B(x, y, z) in some configurations. In some configurations, as an alternative to labels, specific distinct numerical values can be used to indicate constituent components of an imaged volume (e.g., one can use linear attenuation coefficients associated with a different tissue types for some fixed x-ray and/or radiation spectrum as indicators).

In some configurations, a constrained volumetric image 130, B(x, y, z), is a numerical mapping from Q(x, y, z) which produces a "fuzzy" numerical label associated with each tissue type. Such a "fuzzy" labeling allows intermediate tissue labeling in a volumetric image, which can capture partial volume effects, for example. In such a mapping, instead of forcing each voxel to take on one of a set of specific labels (or numerical values) associated with particular material classes, this constraint is relaxed and/or B(x, y, z) takes on voxel intensity values that are allowed to move "closer" to a numerical labels based on image properties. In this way, a voxel intensities in Q(x, y, z) are remapped to a scale related to a labels as described in (1) immediately above, but are actually another set of intensities. Thus, a voxel-values in B(x, y, z) do not correspond to a set of discrete labels, but rather a continuous-valued set of intensity values. For example, in some embodiments, a sets of intervals ((air, air+$\Delta_a$), (fat-$\Delta_f$, fat+$\Delta_f$), (glandular-$\Delta_g$, glandular+$\Delta_g$), (calc-$\Delta_c$, calc+$\Delta_c$)), define a allowable material classes in B(x, y, z). A value in Q(x, y, z) that lies between "fat+$\Delta_f$" and/or "glandular-$\Delta_g$" is rounded to a value either between "fat" and/or "fat+$\Delta_f$" and/or between "glandular" and/or "glandular-$\Delta_g$", depending on a material class constraints. A different value in Q(x, y, z) that lies between "fat-$\Delta_f$" and/or "fat+$\Delta_f$" might remain unchanged, depending on a material class constraints. Thus, mappings need not specifically map a numerical intensity value in Q to a label in B, but can be more broadly defined as a result of applying a material class constraints to Q.

Because target tissue component or vessel and/or medical device or treatment represent exceptions to a two material class tissue composition model, where a two material classes are fat and/or tissue, e.g., in some configurations, they are processed separately, using known image processing techniques to detect target tissue component or vessel and/or medical device or treatment in a projection image dataset with a high degree of reliability. Once target tissue component or vessel and/or medical device or treatment are detected, they can be excluded from a reconstruction procedure and/or a subsequent quantization step and/or reconstructed separately. Three-dimensional tissue, medical device or treatment, information can then be inserted into a constrained reconstruction to recover a full quantitative volumetric image of an imaged part of anatomy relevant for treatment and/or surgery, as well as corresponding medical device/treatment. In some configurations and/or referring to FIG. 7, a separate processing of calcifications at 132 includes a following steps:

At 136, find and/or detect target tissue component or vessel and/or medical device or treatment in each image of 2D image dataset 102 (or quantitative percentage estimate 118).

At 138, perform a 3D reconstruction from a target tissue component or vessel and/or medical device or treatment detection images, and/or save this volumetric image as MC(x, y, z). MC has essentially a zero mean background and/or signal only at a locations of a target tissue component or vessel and/or medical device or treatment.

At 140, find individual target tissue component or vessel and/or medical device or treatment in a 3D volumetric image (i.e., in MC(x, y, z)).

At 142, determine locations at which a target tissue component or vessel and/or medical device or treatment in a volumetric image, MC(x, y, z), manifested themselves in projections (e.g., by re-projecting a 3D volumetric image MC(x, y, z)).

At 144, determine a target tissue component or vessel and/or medical device or treatment corrected quantitative volumetric image Q(x, y, z), e.g., by using one of a following methods (a) (b) and/or (c).

In determining a quantitative volumetric image 124 of a part of anatomy relevant for treatment and/or surgery, Q(x, y, z), at (x, y, z) coordinates that correspond to a location of target tissue component or vessel and/or medical device or treatment in at least one of a projection images, use only that subset of a quantitative projection radiographs, $q_i(u,v)$, that contain no target tissue component or vessel and/or medical device or treatment that would project to that particular (x, y, z) coordinate. Thus, in one step of a reconstruction algorithm, a projection radiographs that contain a target tissue component or vessel and/or medical device or treatment at (u,v) locations that map to a (x, y, z) location being reconstructed are disregarded.

Values in quantitative projection radiographs, $q_i(u,v)$, at (u,v) locations that coincide with a projected location of a target tissue component or vessel and/or medical device or treatment are replaced by an appropriate "calcification corrected" estimate based on neighboring pixel values, and/or a resulting adjusted $q_i(u,v)$ images are used as input for a quantitative reconstruction.

a size and/or x-ray attenuation characteristics of a reconstructed 3D calcifications (found in MC(x, y, z)) are used to correct a corresponding pixel values in a quantitative projection radiographs, $q_i(u,v)$, by "removing" a estimated contribution of a calcifications to a observed images, based on imaging physics. Again, a resulting images are used as input for a quantitative reconstruction. A result of this step is a target tissue component or vessel and/or medical device or treatment corrected quantitative 3D volume Q(x, y, z).

At 146, use a "corrected" target tissue component or vessel and/or medical device or treatment corrected quantitative volumetric image Q(x, y, z) to form a corresponding "constrained volumetric image", B(x, y, z).

At 148, to a constrained quantitative volumetric tissue image, B(x, y, z), combine MC(x, y, z) in an appropriate way.

In some configurations, a resulting volumetric image, B(x, y, z) (or Q(x, y, z)) is iteratively updated at 124 to enforce consistency with an input data, and/or other additional information and/or constraints. For example, a reconstructed volumetric image is re-projected, a re-projected images are compared with a original projection images, and/or a volumetric image is updated so that a deviation between original 2D image dataset and/or a re-projected dataset becomes smaller. This step can be repeated to achieve convergence to a solution that satisfies a re-projection consistency constraint. Furthermore, this iteration may include one and/or more separate steps to update a part of anatomy relevant for treatment and/or surgery, a quantitative volumetric image within a part of anatomy relevant for treatment and/or surgery, Q(x, y, z), and/or a constrained quantitative volumetric image, B(x, y, z), each separately and/or together. Some configurations perform a plurality of these improvement steps at each iteration step. In some configurations, an image used as input to a reconstruction process are updated at each step such that a reconstructed volumetric image based on a updated images is an "improved" volumetric image.

Enforcing consistency between a reconstructed volumetric image (either Q and/or B) and/or a acquired projection images may require a "re-projection" step in which a reconstructed volumetric image is used to produce one and/or more projection images. A reconstructed volumetric image is re-projected in some configurations so that a re-projections are directly comparable to a acquired projection images. A re-projection can be generalized into one that transforms a labeled volumetric image into one and/or more re-projections having pixel intensities that are continuous-valued so that they are comparable to a qi(u,v) projection radiograph dataset.

Determining an error signal for a consistency constraint may be as simple as subtracting images in a 2D image dataset from a set of re-projections on a pixelwise basis. However, other methods for determining an error signal for a set of acquired projections and/or re-projections can be used. A acquired projections are $q_i(u,v)$. A re-projections at iteration j are $r_i(u,v)^{(j)}$ and/or $b_i(u,v)^{(j)}$. A error signal may be some function of a 2D image dataset (or some processed version thereof), as well as all a re-projections at every prior and/or current iteration. That is, a error signal can be:

$$E_j = \Psi(\Xi_0(q(u,v)), \Xi_1(r_1(u,v)), \Xi_2(r_2(u,v)), \ldots, \Xi_j(r_j(u,v)), \Xi_{j+1}(b_1(u,v)), \Xi_{j+2}(b_2(u,v)), \ldots, \Xi_{2j}(b_j(u,v)))$$

Figure 6:
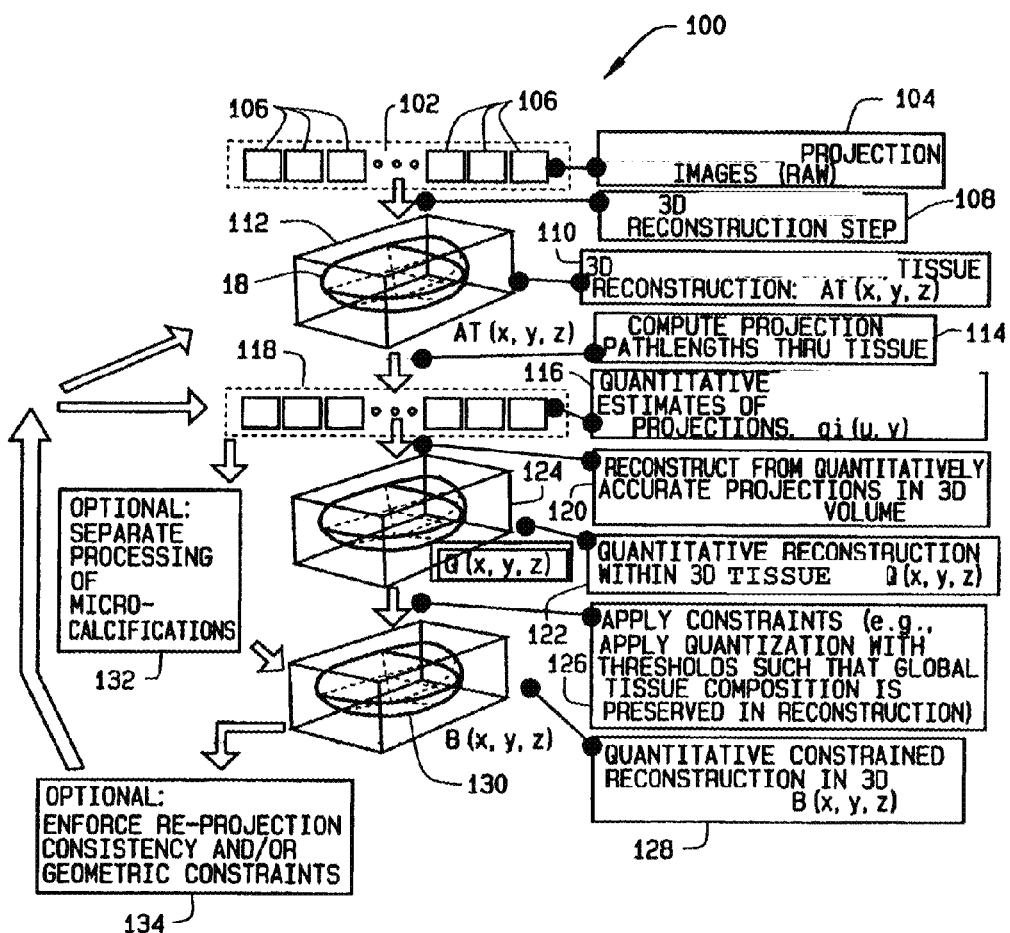
FIG. 6 is a combination flowchart and/or pictorial diagram of steps and/or intermediate results in a configuration of aspects of the invention in which a volumetric image containing quantitative composition estimates of three-dimensional part of anatomy relevant for treatment and/or surgery volumes are reconstructed.

For example, a $\Xi_i$ functions can be used to compute a error at specific regions of a projections and/or weight a errors at specified regions in a projection domain. This is useful because some regions of a re-projections and/or a quantitative projection radiographs themselves may contain differences that are irrelevant to a output volumetric image, B(x, y, z), 130 in FIG. 6, for example. A error function, $\Psi$, takes as inputs two sets of images in a projection domain and/or can be a difference of an image sets and/or a difference with a saturating non-linearity and/or some other nonlinear operation on an image sets. In general, $\Psi$ and/or $\Xi_i$ are functions that can depend on local neighborhoods of pixel intensities and/or global properties of a volumetric image, a acquired projections, and/or a re-projections.

In some configurations, determining a volumetric update to a volumetric image comprises reconstructing a volumetric image that corresponds to a difference between re-projected images and/or a original 2D image dataset 102, and/or adding this "volumetric update image" to a previously determined volumetric image, B(x, y, z) and/or Q(x, y, z), using an appropriate weighting. However, other combinations of reconstructed volumetric images and/or volumetric update images to volumetric images can be used. For example, some configurations combine a reconstructed volumetric image from a previous iteration and/or a "volumetric update image" using a nonlinear transformation. Such a nonlinear transformation can include multiplicative transformations, logarithmic transformations, saturating nonlinearities, and/or other transformations and/or nonlinear look up tables. Such a nonlinear transformation can be applied to either a previous iteration's volumetric image, a volumetric update image, both, and/or a combination, itself, can be remapped nonlinearly. A combination can include spatial filtration, wherein volumetric image voxel intensities are adjusted in accordance with local neighborhood and/or global reconstructed volumetric image properties.

In some configurations, and/or referring to FIG. 8, a variant of an algebraic reconstruction technique (ART) 150 can optionally be used for iterative updates. A technical effect of apparatus 10 (or of other configurations of aspects of the invention) is achieved by a user operating apparatus 10 to perform an initial reconstruction as indicated at 152, 154, 156, 158, and/or 160, from data set 102 (or quantitative percentage estimate 118). A result is constrained at 154 and/or 158 in some, but not all configurations. A volumetric image is re-projected at 164 and/or 166. An error is determined at 162 and/or 158 between re-projection 166 and/or original dataset 102 and/or 118. This error may be determined for one and/or more of a projection images. Some configurations apply an appropriate constraint set at 170 specific to this step and/or iteration. A volumetric update image 176 is reconstructed at 172 using a error signals. Volumetric correction image 176 is constrained at 174 with some constraint set specific to this step and/or iteration in some configurations. At 178, a volumetric correction image 176 is combined with a volumetric image 156 and/or 160 from a previous iteration. A existing volumetric image may be either a quantitative volumetric image, $Q(x, y, z)$, 156 and/or a constrained volumetric image, $B(x, y, z)$ 160. This combination is constrained at 180 in some configurations using a constraint set specific to this step and/or iteration. An iteration is stopped or, if necessary, another iteration is performed by continuing at step 164. A constraints that are utilized in this approach, can be appropriately chosen from a plurality of constraints explained above.

In some configurations of aspects of the invention, appropriate energy functionals (or energy functions and/or energy terms) will assume a minimum for a volumetric images, $B(x, y, z)$, that simultaneously satisfy, and/or arbitrate among, a number of simultaneous constraints. Typically each constraint in a considered constraint set corresponds to a specific term in a energy functional. This energy minimization interpretation leads to strategies and/or algorithms for volumetric image reconstruction that are fundamentally different from a reconstruction algorithm as described up to this point in aspects of the invention. In an implementation-specific approach (as it is described up to this point), where reconstruction steps are designed to satisfy individual constraints one (or few) at a time, variable means can be used to devise reconstruction algorithms consisting of steps that simultaneously satisfy and/or arbitrate among a many constraints desirable in a output volumetric image. Adjustments are made to avoid where one reconstruction step can undo and/or corrupt a desirable property from a previous step of a reconstruction algorithm. In configurations of aspects of the invention in which an energy functional is used to reconstruct a volumetric image, a reconstruction algorithm comprises a number of reconstruction steps (for example, iterations), where generally each step decreases a value of a energy functional by modifying a current estimate of a reconstructed volumetric image. In some configurations of aspects of the invention, optimization methods (coordinate descent, gradient descent, Newton's method, coordinatewise minimization, etc.) are used to find a volumetric image that best either simultaneously satisfies and/or arbitrates among a multiple constraints corresponding to terms of a energy functional. In other configurations, other strategies may be used, where a value of a energy functional does not necessarily decrease in each update step. This may be useful in situations where a energy functional has local minima.

In some configurations of aspects of the invention, and/or referring to flowchart 182 of FIG. 9, a technical effect of apparatus 10 (or another configuration of aspects of the invention) is achieved by a user operating a apparatus to reconstruct a volumetric image of an object, initially by acquiring projections $pi(u,v)$ of an object at 184. In some configurations, projections $pi(u,v)$ are preprocessed at 186 so that they are quantitative projections. A preprocessing may contain such steps as bad pixel correction, gain correction, scatter correction, and/or a correction to remap intensities to reflect a quantitative measure of composition, for example by making an intensities true line integrals free from corrupting physical effects. An initial reconstruction is performed at 187. Initial reconstruction 187 is performed in some configurations by computing $Q(x, y, z)$ and/or $B(x, y, z)$ from $qi(u,v)$. From this $Q(x, y, z)$ and/or $B(x, y, z)$, an appropriate energy to minimize as well as parameters for a minimization may be chosen. An energy definition is chosen at 188 either (a) automatically in accordance with image information, (b) as a default energy, which may depend upon x-ray technique and/or part of anatomy relevant for treatment and/or surgery thickness and/or other similar physical parameters, and/or (c) by interaction with a user, such as by interactively choosing from a list of default energies, and/or (d) a combination of (a), (b), and/or (c). A energy definition at 188 includes at least one term that constrains a reconstructed volumetric image to a material class volumetric image, $B(x, y, z)$, for example, such that every voxel in a material class volumetric image contains only one value (or label) corresponding to a single material class each. Parameters associated with a energy definition selection may also be chosen from an initial volumetric image $Q(x, y, z)$ and/or $B(x, y, z)$. An N-ary reconstruction is performed at 190 by estimating a volumetric image, $B(x, y, z)$, that produces a smallest value of a reconstruction energy functional. This reconstruction can be performed using (a) optimization methods (b) energy computations over a random search of volumetric images, $B(x, y, z)$, and/or (c) exhaustive search (which will produce a absolute minimum of a energy functional and/or a optimal volumetric image for a energy).

In one configuration of aspects of the invention, a energy functional contains a term which increases in value as a voxel intensities in a constrained volumetric image, $B(x, y, z)$, differ from voxel intensities corresponding to a material classes in a hypothesized model of a part of anatomy relevant for treatment and/or surgery. In this case, a energy functional contains an N-ary material class enforcement term such that a value of a N-ary material class enforcement term is minimal when $B(x, y, z)$ contains only a material classes in a hypothesized model of a part of anatomy relevant for treatment and/or surgery (e.g. A term achieves its minimum value when $B(x, y, z)$ contains only labels that correspond exactly to one of a plurality of material class labels and/or $B(x, y, z)$ contains only values that are elements of a material classes—for instance, a two material model may consist of a voxelwise and/or tissue material class labeling). An energy minimizing reconstruction algorithm 190 configured to enforce an N-ary, and/or approximately N-ary, material class volumetric image reconstruction will select a volumetric image, $B(x, y, z)$, that, among candidate volumetric images, minimizes a reconstruction energy functional. That is, a output volumetric image, $B(x, y, z)$, is an N-ary volumetric image. (In some configurations, a minor, but not necessarily preselected portion of a reconstructed volumetric image is permitted to correspond to one and/or a small number of other types of tissues.) Any necessary post-processing steps can be performed at 192, including iterating a reconstruction of steps 186, 188, and/or 190.

In some configurations of aspects of the invention, a difference between a % Gi estimates from a plurality of projection images $qi(u,v)$ and/or reprojection images $ri(u,v)$ from $B(x, y, z)$ and/or some nominal % G for a volumetric image, B(x, y, z), is included in a energy functional to produce % G-consistent volumetric images from a projection dataset. Such a constraint may be incorporated into a energy functional as GC(B), where GC(B) is smallest where a % Gi estimates are aggregately closest to some nominal % G and/or representative % G, and/or where GC(B) is larger as a estimates of percent vary from a nominal estimate and/or amongst themselves. In some configurations a % G value for a current estimate of a volumetric image of a object is determined directly from B(x, y, z) (or Q(x, y, z)) without computing a corresponding re-projected images.

Energy functional minimization approaches have been considered for a wide array of multidimensional processing and/or information extraction tasks, including edge-preserving smoothing volumetric reconstruction, general image restoration, image in-painting, curve evolution, and/or segmentation, among others. These individual applications each have specific energy formulations which define a properties of a resulting processed fields (any image and/or 3D volumetric image, e.g., is a field). Many known energy definitions are intended for processing of observations which are already reconstructed data (slices, images, and/or full 3D volumetric images). These energies, although not image reconstruction energies specifically, are important because they can be tied into an overall conglomerate energy, as defined below. Specific energy definitions with more and/or less limited scope of application are known and/or have been proposed for a number of different reasons, and/or include a number of different terms with different properties. By contrast, some configurations of aspects of the invention consolidate these terms into an overall conglomerate energy functional that has properties that are a function of all such terms, and/or at least of a plurality of specific energy definitions. For example, reconstruction algorithms previously have not been derived from material class decomposition constraints. Generally reconstruction algorithms have not been derived from an energy which contained at least one term that enforced an "N-ary" decomposition of an imaged volume—that is, a minimizer of a energy functional is an "N-ary" volumetric image.

A straightforward energy minimization approach to solving a image reconstruction problems is a least squares solution. In this case, a squared error between projections of a volumetric image and/or a observed projection is minimized. This approach is often referred to as solving an unregularized "inverse problem" where a effect of "projecting" an imaged object is "inverted." This may also be referred to as minimizing a quadratic fidelity term (which represents a energy functional, and/or a term in a more complex energy functional). Although a closed form solution in a least squares sense can be achieved, unregularized solutions to inverse problems often suffer numerical instabilities (high condition number). In most volumetric imaging problems, especially limited angle image reconstruction problems, a unregularized solution (a volumetric image, for example) is (mathematically) not uniquely determined, which can lead to high spatial frequency artifacts. To mitigate numerical stability issues associated with a simple least squares energy, a side constraint can be added to a energy. This side constraint is termed a "regularizer". In most energy minimization methods for volumetric image reconstruction, suitable side constraints are determined so that a reconstruction enjoys desirable properties. Tikhonov proposed side constraints which were quadratic penalties on a actual values of a reconstructed field (A. N. Tikhonov, V. Y. Arsenin, "Solutions of Ill-posed Problems," Wiley, New York, 1977.). Note that energy formulations of a reconstruction problem may lead to identical solutions to reconstruction algorithms already proposed. A Tikhonov energy definition above, for example, is minimized by a volumetric image produced by iterating a additive ART algorithm to convergence. For some applications, it is more appropriate to add a quadratic penalty on a derivative of a reconstructed field because although little may be known about a actual values a reconstructed field should take on, it may be known that a field should be smooth. (A. N. Tikhonov, V. Y. Arsenin, "Solutions of Ill-posed Problems," Wiley, New York, 1977) (all and each of the above entirely incorporated herein by reference).

Such approaches can be of limited value, however, because a quadratic penalty on a derivative rapidly removes edges from solutions (volumetric images, for example) (edge oversmoothing), which are often important sources of information in imagery. To mitigate a edge oversmoothing problem, Osher and/or Rudin proposed a Total Variation energy (S. Osher and/or L. Rudin, "Feature-oriented image enhancement using shock filters." SLAM journal of Numerical Analysis, 27(4):919-940, August, 1990), which is a sum of a quadratic fidelity term and/or a sum of absolute values of a derivative function (e.g., adjacent pixel/voxel differences). Total variation solutions often compare favorably to reconstructions where Tikhonov derivative side constraints are used. Still some investigators have gone further. Specifically, to smooth regions and/or still allow a formation of edges, a Mumford Shah energy functional includes an explicit estimate of a boundaries between regions (D. Mumford, J. Shah, "Boundary detection by minimizing functionals, I." In Proc. of an iEEE Conf. On Computer Vision and/or Pattern Recognition, pages 22-26, 1985.) (all and each of the above entirely incorporated herein by reference).

Using this information, a Tikhonov derivative side constraint and/or a Total Variation energy can be minimized where a derivative penalty is relaxed where an edge is indicated by an auxiliary boundary field. Such approaches suffer numerical issues in their solution because a minimization requires a joint estimation of a reconstructed volumetric image (3D and/or 2D field, e.g.) and/or a segmenting curve (2D surface and/or ID curve, e.g.). To alleviate those numerical issues, other investigators reformulated a binary nature of a segmenting curve to be an auxiliary edge field (instead of a curve in space) (L. Ambrosio, V. M. Tortorelli, "On a approximation of free discontinuity problems," Bollettino Della Unione Matematican italiana, 6-B:105-123, 1992.). This reformulation allowed faster solution methods such as coordinate descent on a joint set of fields. Other approaches to minimizing a variant of a Mumford Shah functional enforce a constraint of estimating a closed curve, which permits a use of fast numerical methods, such as level set methods, for a solution method (A. Tsai, A. Yezzi, A. S. Willsky, "Curve Evolution Implementation of a Mumford-Shah Functional for Image Segmentation, Denoising, Interpolation, and/or Magnification," IEEE Trans. On Image Proc., Vol 10, No. 8, August 2001.). In addition to penalties on a spatial derivative of a reconstructed values, a reconstructed values may themselves be constrained to have a specific intensity distribution. For instance, values of a reconstructed volumetric image may be constrained to be samples of an intensity distribution defined by a Gaussian mixture model (W. M. Wells, W. E. L. Grimson, R. Kikinis, "Adaptive Segmentation of MRI data." IEEE Trans. On Med. Imag., 15(4):429-442, August 1996.). Still other energies incorporate terms which depend on a shapes of structures and/or their registration with corresponding images from other modalities and/or from a same modality with different acquisition parameters (T. F. Cootes, C. Beeston, G. J. Edwards, C. J. Taylor, "A Unified Framework for atlas matching using active appearance models" in A.

Kuba, M. Smal, and/or A. Todd-Pokropek, editors, Lecture Notes in Computer Science 1613: Information Processing in Medical Imaging, volume 1613, pages 322-333. Springer Verlag, 1999.). Such energies include terms which depend on relative locations of structures, an intensity dependence on relative location, and/or a expected curvature (or other shape/morphology descriptor) in different anatomical regions (all and each of the above entirely incorporated herein by reference).

Once an energy is defined, a reconstruction method can be considered as an optimization problem. There are well-known published methods for optimizing (finding minimizers of) energy functionals. These commonly include Newton and/or quasi-Newton methods which implement Hessian updates at each iteration of a minimization process. Davidon-Fletcher-Powell (DFP) and/or Broyden-Fletcher-Goldfarb-Shanno (BFGS) methods, among others, can be used in such a scenario. For energies which have as components, penalties which are absolute values of fields and/or auxiliary fields, parts of solution methods may be formed from linear programming approaches, such as simplex methods and/or Karmarkar's methods, e.g. A host of minimization approaches, such as coordinate descent, gradient descent, simulated annealing, among many other published and/or well-studied minimization and/or optimization methods, may be used for a minimization of any given energy.

Specifically, gradient descent methods update a plurality of independent variables in a energy at each step. A gradient descent method requires 1) an estimate of a local gradient of a energy functional computed at a current estimate of a field and/or 2) a line search in a direction of greatest descent of a energy gradient. To address a first requirement, a gradient of an energy at a given estimate of a field must be estimated; this can be accomplished using a analytic expression for a continuous and/or discrete version of a gradient of a energy, itself (Y. Saad, "Iterative Methods for Sparse Linear Systems." a PWS Series in Computer Science. PWS Publishing Company, a division of International Thomson Publishing, Inc., PWS Publishing Co. Boston, Mass., 1996.), by numerically estimating a gradient from a observations (Matlab Optimization Toolbox Manual, http://www.mathworks.com/products/optimization/), and/or using stochastic methods (Viola, P. A., "Alignment by Maximization of Mutual Information", MIT AI Technical Report No. 1548, June, 1995.). There are a host of line search algorithms in a published literature to address a second requirement. These line-search algorithms include linear searches, logarithmically spaced searches, and/or constant step size searches (W. H. Press, B. P. Flannery, S. A. Teukolsky, W. T. Vetterling, Numerical Recipes, Cambridge Univ. Press, Cambridge, UK (1986)) (all and each of the above entirely incorporated herein by reference).

Because a Tikhonov regularization energy is quadratic, its minimization in a reconstruction is linear. Thus, a Tikhonov regularized reconstruction can be solved using a linear equation solver, such as direct inversion, standard and/or preconditioned conjugate gradient, multigrid methods, and/or Monte Carlo methods. We will group these methods under a umbrella term, linear equation solvers. (A. N. Tikhonov, "Regularization of incorrectly posed problems," Soviet Math. Dokl, vol. 4, pp. 1035-1038, 1963.) (all and each of the above entirely incorporated herein by reference).

The heat equation (as one example of an energy minimization problem) can be solved by convolving a observed field with a gaussian distribution of unit mass whose variance is proportional to a time a field's temperature has been "flowing". It is conceivable that convolution with some other kernel which is different from a gaussian distribution would lead to a solution to some other minimization problem. We will group all solution methods which can be solved by convolution under a umbrella term, convolution methods (Koenderink, J., a structure of images. Biol. Cybern. 50, 363-370, 1984.) (all and each of the above entirely incorporated herein by reference).

Total variation-type energies, including Vogel's and/or Cetin's, can be minimized using half quadratic minimization and/or gradient descent techniques together (C. R. Vogel and/or M. E. Oman, "Fast, robust total variation-based reconstruction of noisy, blurred images," IEEE Trans. On Image Processing, vol. 7 no. 6, pp. 813-824, June 1998, "Feature-enhanced synthetic aperture radar image formation based on nonquadratic regularization," Müjdat Cetin and/or W. Clem Karl, IEEE Trans. Image Processing, vol. 10, no. 4, pp. 623-631, April 2001.) (all and each of the above entirely incorporated herein by reference)

The Wells EM adaptive segmentation energy, which includes terms that minimize a effect of a slowly varying additive field (the bias field) and/or terms that penalize a deviation in intensity value from a given intensity model distribution can be solved by interpreting a energy as proportional to a log likelihood function of a underlying probabilistic model for a field and/or then using expectation maximization methods to compute a maximum likelihood estimate of that field (Adaptive segmentation of MRI data. Wells W M, Kikinis R, Grimson W E L, Jolesz F. IEEE Transactions on Medical Imaging. 1996; 15:429-442) (all and each of the above entirely incorporated herein by reference).

Energies akin to Shah's and/or Yezzi's, which may include an explicit boundary term as an auxiliary field, can be minimized using modified level set methods as described by Sethian. (A. Tsai, A. Yezzi, and/or A. Willsky, "A curve evolution approach to smoothing and/or segmentation using a Mumford-Shah functional," Proc. IEEE Conf. On Computer Vision and/or Pattern Recognition, June 2000, T. Chan and/or L. Vese, "A level set algorithm for minimizing a Mumford-Shah functional in image processing," UCLA Technical Report, 2000.) (all and each of the above entirely incorporated herein by reference).

In this approach, a edge strength function is minimized with respect to a reconstruction, and/or then fixing a reconstruction is minimized with respect to a edge strength function. In each step of a coordinate descent, a linear equation solver is used. (Energy Formulations of Medical Image Segmentations, Ph.D. Thesis, J. Kaufhold, Boston University College of Engineering, Aug. 11, 2000.) (all and each of the above entirely incorporated herein by reference).

In other iterative approaches, a energy functional is not explicitly formulated, but a reconstructed volumetric image is assumed to be subject to certain additional constraints (which can alternatively also be formulated as explicit terms in an energy functional) Examples of these approaches include additive ART, and/or multiplicative ART (MART) (Verhoeven, D., Limited-Data Computed Tomography Algorithms for a Physical Sciences, Appl. Optics, vol. 32, no. 20, July 1993), which both aim at satisfying a re-projection constraint (i.e., they minimize a least squares fidelity term). These iterative methods can be combined with additional constraints, for example by alternating a ART iteration step with an additional update step that modifies a current estimate of a reconstructed volumetric image such that it satisfies a additional constraints. A similar type of approach can be used with other reconstruction methods, like Fourier based reconstruction (B. Claus, M. Yavuz, B. Opsahl-Ong, A Fourier Based Method for Optimal Reconstruction in Digital Tomosynthesis, GE GRC disclosure RD-27853, December 1999, patent filed June 2003), Matrix Inversion Tomosynthesis (MITS—Dobbins III, J. T., Matrix Inversion Tomosynthesis Improvements in Longitudinal X-Ray Slice Imaging, U.S. Pat. No. 4,903,204, filed December 1987), Direct ART (DART—B. Claus, A Non-Iterative Algebraic Reconstruction Technique for Tomosynthesis, GE GRC disclosure RD-30968, August 2002, patent filed September 2003), Generalized Filtered Back projection (GFBP—in Claus B E H, Eberhard J W, Thomas J A, Galbo C E, Pakenas W P, Muller S: Preference Study of Reconstructed Image Quality in Mammographic Tomosynthesis, IWDM 2002—Proc. 6$^{th}$ Intl. Workshop on Digital Mammography, Bremen, Germany, 2002, Springer 2003, also B. Claus, J. Eberhard, Generalized Filtered Back projection Reconstruction in Digital Tomosynthesis, GE GRC disclosure RD-29603, August 2001, patent filed April 2002), Filtered Back projection (FBP—Yavus, M., Edic, P. M., Ishaque, A., N., Patch, S. K., Method and/or Apparatus for Reconstructing Image data Acquired by a Tomosynthesis X-Ray Imaging System, U.S. Pat. No. 6,292,530 B1, Sep. 18, 2001.) etc. by alternatingly applying steps of reconstruction, applying constraints to reconstructed volumetric image, reprojection and/or reconstruction of differences and/or update of reconstructed volumetric image (all and each of the above entirely incorporated herein by reference).

In known methods for a minimization of a energy functional and/or a representation of a data that is utilized in an implementation, a minimization is not worked on a continuous field, but rather on a discrete grid of points. More specifically, a field is defined on a regular lattice and/or computations are performed using values defined on a lattice. However, for discussion, it is often easier to illustrate similarities to prior art in a context of a continuous rather than a discrete formulation of a reconstruction energy.

Examples about how the System is Set Up, Transported, and Used for PCI in a Remote Setting The present embodiments of the invention comprise of cloud servers that reside inside data centers operated by commercial cloud hosting providers. One such an example of cloud hosting providers is Amazon, who offers Elastic Compute Cloud (Amazon EC2), which delivers scalable, pay-as-you-go compute capability in the cloud. Using web services and administration tools offered by the cloud computing platform (e.g. Amazon Web Services, or AWS), software modules, such as Anatomy Reconstruction Cloud Service, Procedure Simulation Cloud Service and Patient Record Cloud Service, can be configured and deployed onto "virtual machines". Those services can be configured to allow for best performance for certain geographical locations.

In order to consume the aforementioned cloud services, hospitals should preferably be equipped with high-speed internet to ensure fast access between the hospital and the cloud data center. At least one dedicated workstation is required for each hospital who subscribes to the cloud services. The workstation will have at least one image display device, preferably a 3D projector. According to one embodiment of the present invention, the workstation is also connected to a picture archiving communication system (PACS) in the hospital. The workstation will be configured as a DICOM node inside the local area network, allowing imaging devices (e.g. X-ray machines) to transmit raw patient images to the workstation.

The workstation is preferably connected to a haptics device, which allows users to rehearse a medical procedure using real medical equipments. For hospitals who lack the resources to purchase high-fidelity simulators, the physicians can still use alternative input devices like mouse or keyboard to simulate insertion of catheters/balloons/stents.

In one embodiment, a physician takes X-ray images from three standard projection angles, and the images are submitted to the cloud center for the purpose of seeking decision support in regards of medical device selection, best viewing angle and procedure rehearsal. Preferably, the physician or his/her designee would also upload additional data fields: symptom status, presence or absence of acute coronary syndrome, history of bypass surgery, extent of ischemia on noninvasive imaging, CAD burden from angiography, and degree of anti-anginal medical therapy.

Upon receiving the raw patient data, the Anatomy Reconstruction Cloud Service will launch a series of algorithms, including projection algorithm, composition algorithm and extraction algorithm (FIG. 10) to build volumetric & polygonal mesh representation of the patient 3D model. The mesh-based 3D model is then sent back to the user for real-time display.

If a physician has requested procedure rehearsal service for the incoming patient, the Procedure Simulation Cloud Service will also be launched to compute interactions between input devices and the 3D/4D patient model.

The outputs from the cloud services will be transmitted back to the workstation in the hospital. The physician will receive specific suggestions about the device choices and severity of the case. The physician can choose to perform a simulation based on those suggestions, and also try out different devices on the virtual patient to investigate best treatment strategies for the patient.

Once the real medical intervention has been started, physicians might consider submitting more X-ray images to the cloud center for more decision supports in the middle of the procedure. One such an example is Chronic Total Occlusion (CTO) intervention, a commonly encountered complex lesions identified in 15% of all patients referred for coronary angiography. As the intervention progresses further, additional blood vessels are illuminated through contrast injection, thus it could be beneficial to evaluate blood vessel's 3D characteristics with the updated X-ray images. Preferably, physicians should consider submitting X-ray images at the end of each intervention too so that the patient's post procedure images can be recorded for future references.

The reconstructed patient 3D/4D models will be archived through the Patient Record Cloud Service, providing training and credentialing opportunities for medical school students and physicians at different geographic locations who have access to the simulation network.

Quantitative information incorporated into three-dimensional volumetric images in various configurations of aspects of the invention adds significant diagnostic value to a reconstructed volumetric image while also providing collateral constraints to aid in management of reconstruction artifacts. Furthermore, in some medical applications, a reconstructed three-dimensional volumetric image of an imaged part of anatomy relevant for treatment and/or surgery and/or other structure can be expressed in terms of its constituent material classes and/or tissue types. As a result, reconstructed volumetric images are completely independent of a technique used to acquire a corresponding 2D image dataset. X-ray technique-independent volumetric images can be used for making comparisons between volumetric images reconstructed from datasets acquired on different dates, for example.

The present invention is not limited to configurations involving part of anatomy relevant for treatment and/or surgery image reconstruction and/or even to medical applications, but rather can be used for quantitative reconstruction of an image of any object that is hypothesized to have a limited number of constituent compositions.

While an invention has been described in terms of various specific embodiments, those skilled in a art will recognize that an invention can be practiced with modification within a spirit and/or scope of a claims.

What is claimed is:

1. A method of creating patient-specific 3D and/or 4D anatomy models based on x-ray images, comprising:
    (a) electronically acquiring 2 to 4 2D anatomy image data sets from 2 to 4 2D images of a single anatomical region corresponding to standard x-ray images that are obtained without a need for pre-processing or analysis of data corresponding to a captured 2D image;
    (b) electronically applying projection, composition and extraction data processing algorithms to provide volumetric and polygonal mesh data sets representing one or both 3D or 4D real time displays of one or both 3D and 4D volumetric representations as said anatomy models; and
    (c) electronically displaying said one or both 3D and 4D volumetric representations as medical imaging data as said anatomy models;
    wherein the 2D image datasets include projection radiographs of the imaged single anatomical structure, the 2D image sets obtained at different angles; and
    wherein the 2D image datasets minimize a selected energy function using image analysis including projection that converts the 2D image data sets into said one or both 3D or 4D real time displays of said one or both 3D or 4D volumetric representations as said medical image data.

2. A method according to claim 1, further comprising using a cloud platform to deliver a aforementioned 3D and/or 4D anatomy model for health care related services.

3. A method according to claim 1, wherein said anatomy models are selection from vessels, organs, tissue, muscle, bone, or nervous system tissue.

4. A method according to claim 1, wherein said displaying is used for training, simulation, diagnosis or treatment procedures by a health care provider or trainee.

5. A method according to claim 4, wherein said healthcare provider or trainee is used as a decision support system for less experienced physicians at a point of care.

6. A method according to claim 2, wherein said cloud-based system further provides diagnosis or treatment recommendations.

7. A method according to claim 6, wherein said diagnosis or treatment recommendations are selected from diagnosis or treatment options, anatomical information for treatment or diagnosis, stent dimensions, optimum x-ray viewing angles, and alternative diagnosis or treatment procedures or devices.

8. A method according to claim 1, where said volumetric and polygonal mesh data sets are stored, retrieved or displayed from databases as a patient registry which incorporates said medical imaging data or 3D/4D patient models.

9. A method according to claim 1, further comprising rehearsing medical procedures using said medical imaging data corresponding to a patient's anatomical 3D or 4D model or virtual devices before a diagnosis or treatment procedure starts.

10. A method for using a cloud platform to deliver procedure trainings for less experienced physicians, comprising using medical imaging data according to claim 1.

11. A method of benchmarking hospitals or doctors by comparing pre-procedure and/or post-procedure 3D/4D data in a patient registry, comprising using medical imaging data according to claim 1.

12. A method according to claim 2, wherein said cloud-based services are accessible through any available input or output device.

13. A method of using 3D projectors to provide an immersive 3D medical training classroom experience, comprising using medical imaging data according to claim 1.

14. A method according to claim 13, wherein health care providers from different locations are provided in the form a virtual team to operate on a virtual or actual patient.

15. A method according to claim 1, wherein said method is conducted in an offline mode when an internet connection is not available.

16. A method according to claim 15, further comprising providing medical image data synchronizing of offline medial image data when an internet connection becomes available.

* * * * *